United States Patent
Tamura

(10) Patent No.: US 7,664,326 B2
(45) Date of Patent: Feb. 16, 2010

(54) METHOD AND APPARATUS OF IMAGE PROCESSING TO DETECT AND ENHANCE EDGES

(75) Inventor: Tadashi Tamura, North Haven, CT (US)

(73) Assignee: Aloka Co., Ltd, Tokyo (JP)

(*) Notice: Subject to any disclaimer, the term of this patent is extended or adjusted under 35 U.S.C. 154(b) by 603 days.

(21) Appl. No.: 11/065,626

(22) Filed: Feb. 23, 2005

(65) Prior Publication Data

US 2006/0020203 A1    Jan. 26, 2006

Related U.S. Application Data

(60) Provisional application No. 60/586,589, filed on Jul. 9, 2004.

(51) Int. Cl.
G06K 9/48     (2006.01)
G06K 9/40     (2006.01)

(52) U.S. Cl. .................. 382/199; 382/260; 382/261; 382/266

(58) Field of Classification Search .............. 382/199, 382/260, 261, 266
See application file for complete search history.

(56) References Cited

U.S. PATENT DOCUMENTS

| | | | |
|---|---|---|---|
| 4,720,871 A | 1/1988 | Chambers | |
| 4,947,446 A | 8/1990 | Jutand | |
| 5,148,809 A * | 9/1992 | Biegeleisen-Knight et al. | 600/443 |
| 5,351,305 A * | 9/1994 | Wood et al. | 382/128 |
| 6,389,441 B1 | 5/2002 | Archer | |
| 6,721,457 B1 * | 4/2004 | Atkins et al. | 382/260 |
| 6,941,323 B1 * | 9/2005 | Galperin | 382/260 |
| 7,288,068 B2 * | 10/2007 | Bakircioglu et al. | 600/455 |
| 2001/0015815 A1 * | 8/2001 | Hada et al. | 358/1.9 |
| 2005/0107704 A1 * | 5/2005 | Von Behren et al. | 600/443 |
| 2005/0131300 A1 * | 6/2005 | Bakircioglu et al. | 600/453 |
| 2005/0149360 A1 * | 7/2005 | Galperin | 705/2 |
| 2006/0013501 A1 * | 1/2006 | Tamura | 382/260 |

OTHER PUBLICATIONS

Gonzalez et al., Digital Image Processing Second Addition, Prentice Hall, Upper Saddle River, New Jersey 07548 2002.

* cited by examiner

*Primary Examiner*—John B Strege
(74) *Attorney, Agent, or Firm*—Buckley, Maschoff & Talwalkar LLC

(57) ABSTRACT

A method for detecting and enhancing edges in an ultrasound image includes the steps of applying an edge detection filter to at least one of a plurality of pixels of an ultrasound image to compute an edge detection value having a magnitude and a direction; and applying either a directional edge enhancement filter or a non-directional smoothing filter to at least one of the plurality of pixels of the ultrasound image.

48 Claims, 32 Drawing Sheets

FLOW CHART OF LOGIC OF THE METHOD OF THE PRESENT INVENTION

| -1 | -1 | -1 |
|---|---|---|
| 0 | 0 | 0 |
| 1 | 1 | 1 |

— 11

| -1 | 0 | 1 |
|---|---|---|
| -1 | 0 | 1 |
| -1 | 0 | 1 |

| -1 | -2 | -1 |
|---|---|---|
| 0 | 0 | 0 |
| 1 | 2 | 1 |

— 15

| -1 | 0 | 1 |
|---|---|---|
| -2 | 0 | 2 |
| -1 | 0 | 1 |

| 1 | 0 |
|---|---|
| 0 | -1 |

— 19

| 0 | 1 |
|---|---|
| -1 | 0 |

| 1 | 1 | 1 |
|---|---|---|
| 1 | 1 | 1 |
| 1 | 1 | 1 |

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |

| 1 | 1 | 1 | 1 | 1 | 1 | 1 |
|---|---|---|---|---|---|---|
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |

| | |
|---|---|
| −1 | |
| 0 | |
| 1 | |

FIG. 3b
(PRIOR ART)

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |

FIG. 3c
(PRIOR ART)

| −1 | −1 | −1 | −1 | −1 |
|---|---|---|---|---|
| −1 | −1 | −1 | −1 | −1 |
| −1 | −1 | −1 | −1 | −1 |
| −1 | −1 | −1 | −1 | −1 |
| −1 | −1 | −1 | −1 | −1 |
| 0 | 0 | 0 | 0 | 0 |
| 0 | 0 | 0 | 0 | 0 |

FIG. 3d
(PRIOR ART)

| 0 | 0 | 0 | 0 | 0 |
|---|---|---|---|---|
| 0 | 0 | 0 | 0 | 0 |
| 1 | 1 | 1 | 1 | 1 |
| 1 | 1 | 1 | 1 | 1 |
| 1 | 1 | 1 | 1 | 1 |
| 1 | 1 | 1 | 1 | 1 |
| 1 | 1 | 1 | 1 | 1 |

| −1 | −1 | −1 | −1 | −1 |
|---|---|---|---|---|
| −1 | −1 | −1 | −1 | −1 |
| 0 | 0 | 0 | 0 | 0 |
| 0 | 0 | 0 | 0 | 0 |
| 0 | 0 | 0 | 0 | 0 |
| 1 | 1 | 1 | 1 | 1 |
| 1 | 1 | 1 | 1 | 1 |

FIG. 3e

| −1 | −1 | −1 | −1 | −1 |
|---|---|---|---|---|
| −1 | −1 | −1 | −1 | −1 |
| −1 | −1 | −1 | −1 | −1 |
| 0 | 0 | 0 | 0 | 0 |
| 1 | 1 | 1 | 1 | 1 |
| 1 | 1 | 1 | 1 | 1 |
| 1 | 1 | 1 | 1 | 1 |

FIG. 4

| 0 | -1 | -1 | -1 | -1 | -1 | -1 | -1 | -1 |
|---|----|----|----|----|----|----|----|----|
| 1 | 0  | -1 | -1 | -1 | -1 | -1 | -1 | -1 |
| 1 | 1  | 0  | -1 | -1 | -1 | -1 | -1 | -1 |
| 1 | 1  | 1  | 0  | -1 | -1 | -1 | -1 | -1 |
| 1 | 1  | 1  | 1  | 0  | -1 | -1 | -1 | -1 |
| 1 | 1  | 1  | 1  | 1  | 0  | -1 | -1 | -1 |
| 1 | 1  | 1  | 1  | 1  | 1  | 0  | -1 | -1 |
| 1 | 1  | 1  | 1  | 1  | 1  | 1  | 0  | -1 |
| 1 | 1  | 1  | 1  | 1  | 1  | 1  | 1  | 0  |

FIG. 5a

| -1 | -1 | -1 | -1 | -1 | -1 | -1 | -1 | 0 |
|----|----|----|----|----|----|----|----|---|
| -1 | -1 | -1 | -1 | -1 | -1 | -1 | 0  | 1 |
| -1 | -1 | -1 | -1 | -1 | -1 | 0  | 1  | 1 |
| -1 | -1 | -1 | -1 | -1 | 0  | 1  | 1  | 1 |
| -1 | -1 | -1 | -1 | 0  | 1  | 1  | 1  | 1 |
| -1 | -1 | -1 | 0  | 1  | 1  | 1  | 1  | 1 |
| -1 | -1 | 0  | 1  | 1  | 1  | 1  | 1  | 1 |
| -1 | 0  | 1  | 1  | 1  | 1  | 1  | 1  | 1 |
| 0  | 1  | 1  | 1  | 1  | 1  | 1  | 1  | 1 |

| -1 | -1 | -1 | -1 | -1 | -1 | 0 | 1 | 1 |
|----|----|----|----|----|----|---|---|---|
| -1 | -1 | -1 | -1 | -1 | -1 | 0 | 1 | 1 |
| -1 | -1 | -1 | -1 | -1 | 0 | 1 | 1 | 1 |
| -1 | -1 | -1 | -1 | -1 | 0 | 1 | 1 | 1 |
| -1 | -1 | -1 | -1 | 0 | 1 | 1 | 1 | 1 |
| -1 | -1 | -1 | 0 | 1 | 1 | 1 | 1 | 1 |
| -1 | -1 | -1 | 0 | 1 | 1 | 1 | 1 | 1 |
| -1 | -1 | 0 | 1 | 1 | 1 | 1 | 1 | 1 |
| -1 | -1 | 0 | 1 | 1 | 1 | 1 | 1 | 1 |

| -1 | -1 | -1 | -1 | -1 | -1 | -1 | -1 | -1 |
|----|----|----|----|----|----|----|----|----|
| -1 | -1 | -1 | -1 | -1 | -1 | -1 | -1 | -1 |
| -1 | -1 | -1 | -1 | -1 | -1 | -1 | 0 | 0 |
| -1 | -1 | -1 | -1 | -1 | 0 | 0 | 1 | 1 |
| -1 | -1 | -1 | -1 | 0 | 1 | 1 | 1 | 1 |
| -1 | -1 | 0 | 0 | 1 | 1 | 1 | 1 | 1 |
| 0 | 0 | 1 | 1 | 1 | 1 | 1 | 1 | 1 |
| 1 | 1 | 1 | 1 | 1 | 1 | 1 | 1 | 1 |
| 1 | 1 | 1 | 1 | 1 | 1 | 1 | 1 | 1 |

| 1 | 1 | 0 | -1 | -1 | -1 | -1 | -1 | -1 |
|---|---|---|----|----|----|----|----|----|
| 1 | 1 | 0 | -1 | -1 | -1 | -1 | -1 | -1 |
| 1 | 1 | 1 | 0  | -1 | -1 | -1 | -1 | -1 |
| 1 | 1 | 1 | 0  | -1 | -1 | -1 | -1 | -1 |
| 1 | 1 | 1 | 1  | 0  | -1 | -1 | -1 | -1 |
| 1 | 1 | 1 | 1  | 1  | 0  | -1 | -1 | -1 |
| 1 | 1 | 1 | 1  | 1  | 0  | -1 | -1 | -1 |
| 1 | 1 | 1 | 1  | 1  | 1  | 0  | -1 | -1 |
| 1 | 1 | 1 | 1  | 1  | 1  | 0  | -1 | -1 |

| -1 | -1 | -1 | -1 | -1 | -1 | -1 | -1 | -1 |
|----|----|----|----|----|----|----|----|----|
| -1 | -1 | -1 | -1 | -1 | -1 | -1 | -1 | -1 |
| 0  | 0  | -1 | -1 | -1 | -1 | -1 | -1 | -1 |
| 1  | 1  | 0  | 0  | -1 | -1 | -1 | -1 | -1 |
| 1  | 1  | 1  | 1  | 0  | -1 | -1 | -1 | -1 |
| 1  | 1  | 1  | 1  | 1  | 0  | 0  | -1 | -1 |
| 1  | 1  | 1  | 1  | 1  | 1  | 1  | 0  | 0  |
| 1  | 1  | 1  | 1  | 1  | 1  | 1  | 1  | 1  |
| 1  | 1  | 1  | 1  | 1  | 1  | 1  | 1  | 1  |

| -1 | -1 | -1 | -1 | -1 | -1 | -1 | -1 | -1 |
|----|----|----|----|----|----|----|----|----|
| -1 | -1 | -1 | -1 | -1 | -1 | -1 | -1 | -1 |
| -1 | -1 | -1 | -1 | -1 | -1 | -1 | -1 | -1 |
| -1 | -1 | -1 | -1 | -1 | -1 | -1 | -1 | -1 |
| 0  | 0  | 0  | 0  | 0  | 0  | 0  | 0  | 0  |
| 1  | 1  | 1  | 1  | 1  | 1  | 1  | 1  | 1  |
| 1  | 1  | 1  | 1  | 1  | 1  | 1  | 1  | 1  |
| 1  | 1  | 1  | 1  | 1  | 1  | 1  | 1  | 1  |
| 1  | 1  | 1  | 1  | 1  | 1  | 1  | 1  | 1  |

| -1 | -1 | -1 | -1 | 0 | 1 | 1 | 1 | 1 |
|----|----|----|----|---|---|---|---|---|
| -1 | -1 | -1 | -1 | 0 | 1 | 1 | 1 | 1 |
| -1 | -1 | -1 | -1 | 0 | 1 | 1 | 1 | 1 |
| -1 | -1 | -1 | -1 | 0 | 1 | 1 | 1 | 1 |
| -1 | -1 | -1 | -1 | 0 | 1 | 1 | 1 | 1 |
| -1 | -1 | -1 | -1 | 0 | 1 | 1 | 1 | 1 |
| -1 | -1 | -1 | -1 | 0 | 1 | 1 | 1 | 1 |
| -1 | -1 | -1 | -1 | 0 | 1 | 1 | 1 | 1 |
| -1 | -1 | -1 | -1 | 0 | 1 | 1 | 1 | 1 |

FIG. 5h

| -a | -a | -a | -a | -a | -a | -a | -a | -a |
|----|----|----|----|----|----|----|----|----|
| -a | -a | -a | -a | -a | -a | -a | -a | -a |
| -a | -a | -a | -a | -a | -a | -a | -a | -a |
| -a | -a | -a | -a | -a | -a | -a | -a | -a |
| 0  | 0  | 0  | 0  | 0  | 0  | 0  | 0  | 0  |
| a  | a  | a  | a  | a  | a  | a  | a  | a  |
| a  | a  | a  | a  | a  | a  | a  | a  | a  |
| a  | a  | a  | a  | a  | a  | a  | a  | a  |
| a  | a  | a  | a  | a  | a  | a  | a  | a  |

| -a | -a | -a | -a | 0 | a | a | a | a |
|----|----|----|----|---|---|---|---|---|
| -a | -a | -a | -a | 0 | a | a | a | a |
| -a | -a | -a | -a | 0 | a | a | a | a |
| -a | -a | -a | -a | 0 | a | a | a | a |
| -a | -a | -a | -a | 0 | a | a | a | a |
| -a | -a | -a | -a | 0 | a | a | a | a |
| -a | -a | -a | -a | 0 | a | a | a | a |
| -a | -a | -a | -a | 0 | a | a | a | a |
| -a | -a | -a | -a | 0 | a | a | a | a |

| -a11 | -a12 | -a13 | -a14 | -a15 | -a16 | -a17 | -a18 | -a19 |
|---|---|---|---|---|---|---|---|---|
| -a21 | -a22 | -a23 | -a24 | -a25 | -a26 | -a27 | -a28 | -a29 |
| -a31 | -a32 | -a33 | -a34 | -a35 | -a36 | -a37 | -a38 | -a39 |
| -a41 | -a42 | -a43 | -a44 | -a45 | -a46 | -a47 | -a48 | -a49 |
| 0 | 0 | 0 | 0 | 0 | 0 | 0 | 0 | 0 |
| a41 | a42 | a43 | a44 | a45 | a46 | a47 | a48 | a49 |
| a31 | a32 | a33 | a34 | a35 | a36 | a37 | a38 | a39 |
| a21 | a22 | a23 | a24 | a25 | a26 | a27 | a28 | a29 |
| a11 | a12 | a13 | a14 | a15 | a16 | a17 | a18 | a19 |

*FIG. 7a*

| -a11 | -a21 | -a31 | -a41 | 0 | a41 | a31 | a21 | a11 |
|---|---|---|---|---|---|---|---|---|
| -a12 | -a22 | -a32 | -a42 | 0 | a42 | a32 | a22 | a12 |
| -a13 | -a23 | -a33 | -a43 | 0 | a43 | a33 | a23 | a13 |
| -a14 | -a24 | -a34 | -a44 | 0 | a44 | a34 | a24 | a14 |
| -a15 | -a25 | -a35 | -a45 | 0 | a45 | a35 | a25 | a15 |
| -a16 | -a26 | -a36 | -a46 | 0 | a46 | a36 | a26 | a16 |
| -a17 | -a27 | -a37 | -a47 | 0 | a47 | a37 | a27 | a17 |
| -a18 | -a28 | -a38 | -a48 | 0 | a48 | a38 | a28 | a18 |
| -a19 | -a29 | -a39 | -a49 | 0 | a49 | a39 | a29 | a19 |

*FIG. 7b*

| −b1b1 | −b2b1 | −b3b1 | −b4b1 | −b5b1 | −b4b1 | −b3b1 | −b2b1 | −b1b1 |
|---|---|---|---|---|---|---|---|---|
| −b1b2 | −b2b2 | −b3b2 | −b4b2 | −b5b2 | −b4b2 | −b3b2 | −b2b2 | −b1b2 |
| −b1b3 | −b2b3 | −b3b3 | −b4b3 | −b5b3 | −b4b3 | −b3b3 | −b2b3 | −b1b3 |
| −b1b4 | −b2b4 | −b3b4 | −b4b4 | −b5b4 | −b4b4 | −b3b4 | −b2b4 | −b1b4 |
| 0 | 0 | 0 | 0 | 0 | 0 | 0 | 0 | 0 |
| b1b4 | b2b4 | b3b4 | b4b4 | b5b4 | b4b4 | b3b4 | b2b4 | b1b4 |
| b1b3 | b2b3 | b3b3 | b4b3 | b5b3 | b4b3 | b3b3 | b2b3 | b1b3 |
| b1b2 | b2b2 | b3b2 | b4b2 | b5b2 | b4b2 | b3b2 | b2b2 | b1b2 |
| b1b1 | b2b1 | b3b1 | b4b1 | b5b1 | b4b1 | b3b1 | b2b1 | b1b1 |

*FIG. 8a*

| −b1b1 | −b1b2 | −b1b3 | −b1b4 | 0 | b1b4 | b1b3 | b1b2 | b1b1 |
|---|---|---|---|---|---|---|---|---|
| −b2b1 | −b2b2 | −b2b3 | −b2b4 | 0 | b2b4 | b2b3 | b2b2 | b2b1 |
| −b3b1 | −b3b2 | −b3b3 | −b3b4 | 0 | b3b4 | b3b3 | b3b2 | b3b1 |
| −b4b1 | −b4b2 | −b4b3 | −b4b4 | 0 | b4b4 | b4b3 | b4b2 | b4b1 |
| −b5b1 | −b5b2 | −b5b3 | −b5b4 | 0 | b5b4 | b5b3 | b5b2 | b5b1 |
| −b4b1 | −b4b2 | −b4b3 | −b4b4 | 0 | b4b4 | b4b3 | b4b2 | b4b1 |
| −b3b1 | −b3b2 | −b3b3 | −b3b4 | 0 | b3b4 | b3b3 | b3b2 | b3b1 |
| −b2b1 | −b2b2 | −b2b3 | −b2b4 | 0 | b2b4 | b2b3 | b2b2 | b2b1 |
| −b1b1 | −b1b2 | −b1b3 | −b1b4 | 0 | b1b4 | b1b3 | b1b2 | b1b1 |

*FIG. 8b*

|  -1 | -1 | 0 | 1 | 1 |
|----|----|---|---|---|
| -1 | -1 | 0 | 1 | 1 |
| -1 | -1 | 0 | 1 | 1 |
| -1 | -1 | 0 | 1 | 1 |
| -1 | -1 | 0 | 1 | 1 |

VERTICAL EDGE DETECTION FILTER

| -1 | -1 | -1 | -1 | -1 |
|----|----|----|----|----|
| -1 | -1 | -1 | -1 | -1 |
| 0 | 0 | 0 | 0 | 0 |
| 1 | 1 | 1 | 1 | 1 |
| 1 | 1 | 1 | 1 | 1 |

HORIZONTAL EDGE DETECTION FILTER

| 0 | 0 | 0 | 0 | 0 |
|---|---|---|---|---|
| 0 | 0 | 0 | 0 | 0 |
| 1 | 1 | 1 | 1 | 1 |
| 0 | 0 | 0 | 0 | 0 |
| 0 | 0 | 0 | 0 | 0 |

HORIZONTAL EDGE ENHANCEMENT FILTER (STRONGER)

| 0 | 0 | 0 | 0 | 0 |
|---|---|---|---|---|
| 0 | 0 | 0 | 0 | 0 |
| 0 | 1 | 1 | 1 | 0 |
| 0 | 0 | 0 | 0 | 0 |
| 0 | 0 | 0 | 0 | 0 |

HORIZONTAL EDGE ENHANCEMENT FILTER (WEAKER)

| -1 | -1 | -1 | -1 | 0 |
|----|----|----|----|----|
| -1 | -1 | -1 | 0  | 1 |
| -1 | -1 | 0  | 1  | 1 |
| -1 | 0  | 1  | 1  | 1 |
| 0  | 1  | 1  | 1  | 1 |

45 DEGREE EDGE DETECTION FILTER

| 0 | -1 | -1 | -1 | -1 |
|---|----|----|----|----|
| 1 | 0  | -1 | -1 | -1 |
| 1 | 1  | 0  | -1 | -1 |
| 1 | 1  | 1  | 0  | -1 |
| 1 | 1  | 1  | 1  | 0  |

−45 DEGREE EDGE DETECTION FILTER

| 0 | 0 | 1 | 0 | 0 |
|---|---|---|---|---|
| 0 | 0 | 1 | 0 | 0 |
| 0 | 0 | 1 | 0 | 0 |
| 0 | 0 | 1 | 0 | 0 |
| 0 | 0 | 1 | 0 | 0 |

VERTICAL EDGE ENHANCEMENT FILTER (STRONGER)

| 0 | 0 | 0 | 0 | 0 |
|---|---|---|---|---|
| 0 | 0 | 1 | 0 | 0 |
| 0 | 0 | 1 | 0 | 0 |
| 0 | 0 | 1 | 0 | 0 |
| 0 | 0 | 0 | 0 | 0 |

VERTICAL EDGE ENHANCEMENT FILTER (WEAKER)

| 0 | 0 | 0 | 0 | 1 |
|---|---|---|---|---|
| 0 | 0 | 0 | 1 | 0 |
| 0 | 0 | 1 | 0 | 0 |
| 0 | 1 | 0 | 0 | 0 |
| 1 | 0 | 0 | 0 | 0 |

45 DEGREE EDGE ENHANCEMENT FILTER (STRONGER)

| 0 | 0 | 0 | 0 | 0 |
|---|---|---|---|---|
| 0 | 0 | 0 | 1 | 0 |
| 0 | 0 | 1 | 0 | 0 |
| 0 | 1 | 0 | 0 | 0 |
| 0 | 0 | 0 | 0 | 0 |

45 DEGREE EDGE ENHANCEMENT FILTER (WEAKER)

| 1 | 0 | 0 | 0 | 0 |
|---|---|---|---|---|
| 0 | 1 | 0 | 0 | 0 |
| 0 | 0 | 1 | 0 | 0 |
| 0 | 0 | 0 | 1 | 0 |
| 0 | 0 | 0 | 0 | 1 |

−45 DEGREE EDGE ENHANCEMENT FILTER (STRONGER)

| 0 | 0 | 0 | 0 | 0 |
|---|---|---|---|---|
| 0 | 1 | 0 | 0 | 0 |
| 0 | 0 | 1 | 0 | 0 |
| 0 | 0 | 0 | 1 | 0 |
| 0 | 0 | 0 | 0 | 0 |

−45 DEGREE EDGE ENHANCEMENT FILTER (WEAKER)

| 1 | 1 | 1 | 1 | 1 |
|---|---|---|---|---|
| 1 | 1 | 1 | 1 | 1 |
| 1 | 1 | 1 | 1 | 1 |
| 1 | 1 | 1 | 1 | 1 |
| 1 | 1 | 1 | 1 | 1 |

SPECKLE REDUCTION FILTER (STRONG)

| 1 | 1 | 1 |
|---|---|---|
| 1 | 1 | 1 |
| 1 | 1 | 1 |

SPECKLE REDUCTION FILTER (WEAK)

FLOW CHART OF SELECTION OF AN EDGE ENHANCEMENT FILTER

FLOW CHART OF SELECTION OF A NON-DIRECTIONAL SMOOTHING FILTER

| | E-8M5 | E-6M5 | E-4M5 | E-2M5 | E0M5 | E2M5 | E4M5 | E6M5 | E8M5 |
|---|---|---|---|---|---|---|---|---|---|
| MAG5 | | | | | | | | | |
| MAG4 | E-8M4 | E-6M4 | E-4M4 | E-2M4 | E0M4 | E2M4 | E4M4 | E6M4 | E8M4 |
| MAG3 | E-8M3 | E-6M3 | E-4M3 | E-2M3 | E0M3 | E2M3 | E4M3 | E6M3 | E8M3 |
| MAG2 | SM2 | SM2 | SM2 | SM2 | SM2 | SM2 | SM2 | SM2 | SM2 |
| MAG1 | SM1 | SM1 | SM1 | SM1 | SM1 | SM1 | SM1 | SM1 | SM1 |
| MAG/DIRECTION | -80° | -60° | -40° | -20° | 0° | 20° | 40° | 60° | 80° |

FILTER SELECT LOOK-UP TABLE

*FIG. 27*

METHOD AND APPARATUS OF IMAGE PROCESSING TO DETECT AND ENHANCE EDGES

CROSS-REFERENCE TO RELATED APPLICATION

This application claims the benefit of U.S. Provisional Application Ser. No. 60/586,589, filed Jul. 9, 2004.

BACKGROUND OF THE INVENTION

1. Field of Invention

The present invention relates to a method, and apparatus for performing such method, of image processing to detect and enhance edges and to reduce noise in ultrasound imaging. Specifically, the method relates to the detection of edges in noisy images and the enhancement the edges and the image.

2. Description of Related Art

An ultrasound image consists of back-scattered signals from many scatterers in the sample volume (or image cell) Interference effects of these many signals may enhance signals or cancel each other, creating grainy images. These grains are called speckles and thus the ultrasound image is represented by these grains or speckles even if the imaged area is considered to be homogeneous tissue with monotone contrast. In such instances, the ultrasound image looks noisy as the true tissue is hidden behind this curtain of grain noises absent image processing to remove the noise. Generally, a smoothing filter is applied to the ultrasound image to reduce speckles by smoothing out grains or noises. In the middle of an organ, such as a liver, liver tissue may be considered homogenous and thus should have monotone contrast and speckles in this area should be smoothed. If the same smoothing filter is applied to the liver borders or all areas in the image, the liver borders or edges become blurred or fuzzy.

What is therefore needed is a method for determining if a pixel in an image represents a homogeneous tissue area to which a smoothing algorithm should be applied.

SUMMARY OF THE INVENTION

A method for detecting and enhancing edges in an ultrasound image comprises the steps of applying an edge detection filter to at least one of a plurality of pixels of an ultrasound image to compute an edge detection value comprising a magnitude and a direction; and applying either a directional edge enhancement filter or a non-directional smoothing filter to at least one of the plurality of pixels of the ultrasound image.

A method for detecting and enhancing edges in an ultrasound image comprises the steps of applying a two-dimensional edge detection filter to at least one of a plurality of pixels of an ultrasound image to compute an edge detection value comprising a magnitude and a direction; applying a directional edge enhancement filter to an edge of at least one of the plurality of pixels of the ultrasound image; and applying a non-directional smoothing filter to a homogeneous area of at least one of the plurality of pixels of the ultrasound image.

An image processor for an ultrasound device comprises an edge detection filter; a filter select look-up table; and an image process filter, wherein the edge detection filter, filter select look-up table and image process filter are in communication with each other.

An apparatus for detecting and enhancing edges and detecting and smoothing homogeneous areas in an ultrasound image comprises a set of instructions to detect and enhance one or more edges and to detect and smooth one or more homogeneous areas in an ultrasound image.

An article of manufacturing comprises a computer usable medium having a set of instruction means embodied therein for detecting and enhancing one or more edges and for detecting and smoothing one or more homogeneous areas in an ultrasound image, the computer usable medium comprises a set of instruction means for causing the set of instructions to apply an edge detection filter across at least one of a plurality of pixels of an ultrasound image to compute an edge detection value comprising a magnitude and a direction; and a set of instruction means for causing the set of instructions to apply either a directional edge enhancement filter or a non-directional smoothing filter to at least one of the plurality of pixels of the ultrasound image.

A system comprises a computer usable medium having a set of instructions for detecting and enhancing one or more edges and for detecting and smoothing one or more homogeneous areas in an ultrasound image.

A program storage device readable by machine, tangibly embodying a program of instructions executable by the machine to perform method steps for detecting and enhancing one or more edges and for detecting and smoothing one or more homogeneous areas in an ultrasound image comprises applying an edge detection filter across at least one of a plurality of pixels of an ultrasound image to compute an edge detection value comprising a magnitude and a direction; and applying either a directional edge enhancement filter or a non-directional smoothing filter to at least one of the plurality of pixels of the ultrasound image.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 1a-c depicts edge detection filters of the prior art;

FIGS. 2a-c depicts smoothing filters of the prior art;

FIG. 3a depicts a 1×3 edge detection filter of the prior art;

FIG. 3b depicts a 5×5 low pass filter of the prior art;

FIG. 3c illustrates another edge detection filter of the prior art by combining a −1 edge detection filter coefficient with the 5×5 low-pass filter of FIG. 3b;

FIG. 3d illustrates yet another edge detection filter of the prior art by combining a +1 edge detection filter coefficient with the 5×5 low-pass filter of FIG. 3b;

FIG. 3e illustrates still another edge detection filter of the prior art by combining the edge detection filters of FIGS. 3c and 3d;

FIG. 4 depicts an edge detection filter of the present invention;

FIGS. 5a-h depicts various exemplary embodiments of edge detection filters of various directions in accordance with the present invention;

FIGS. 6a-b depict exemplary embodiments of edge detection filters of horizontal and vertical directions of the present invention;

FIGS. 7a-b depict another exemplary embodiment of edge detection filters of both horizontal and vertical directions of the present invention;

FIGS. 8a-b depict yet another exemplary embodiment of edge detection filters of both horizontal and vertical directions;

FIG. 19a depicts a vertical edge detection filter of the present invention;

FIG. 19b depicts a horizontal edge detection filter of the present invention;

FIG. 19c depicts an exemplary embodiment of a +45-degree edge detection filter of the present invention;

FIG. 19d depicts an exemplary embodiment of a −45-degree edge detection filter of the present;

FIG. 20a depicts a strong horizontal edge enhancement filter of the present invention;

FIG. 20b depicts a weak horizontal edge enhancement filter of the present invention;

FIG. 21a depicts a strong vertical edge enhancement filter of the present invention;

FIG. 21b depicts a weak vertical edge enhancement filter of the present invention;

FIG. 22a depicts a strong +45-degree edge enhancement filter of the present invention;

FIG. 22b depicts a weak 45-degree edge enhancement filter of the present invention;

FIG. 23a depicts an exemplary embodiment of a strong −45-degree edge enhancement filter of the present invention;

FIG. 23b depicts an exemplary embodiment of a weak −45-degree edge enhancement filter of the present invention;

FIG. 24a depicts an exemplary embodiment of a strong smoothing filter of the present invention;

FIG. 24b depicts an exemplary embodiment of a weak smoothing filter of the present invention;

FIG. 27 depicts an exemplary embodiment of a filter select look-up-table of the present invention.

DETAILED DESCRIPTION OF THE PREFERRED EMBODIMENT(S)

Figure 9A:
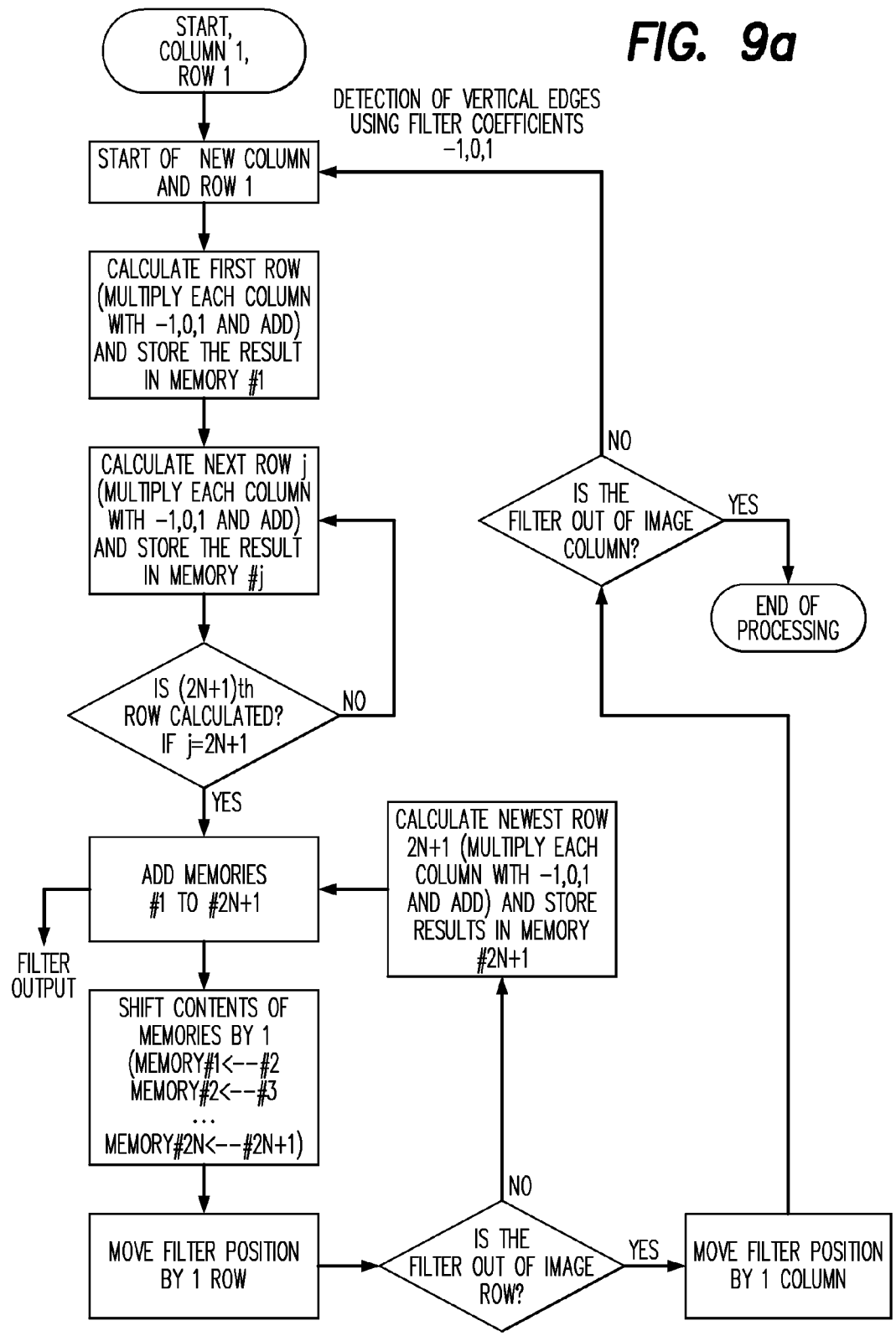
FIG. 9a illustrates a flow chart for a method of detecting a vertical edge using a set of filter coefficients (−1, 0, 1) in accordance with the present invention.

Accordingly, it is an object of the present invention to provide a method, and apparatus for performing such method, of image processing to detect and enhance edges and to reduce noise in ultrasound imaging. Specifically, the method relates to the detection of edges in noisy images and the enhancement the edges and the image.

It is therefore a teaching of the present invention to provide a method for determining if a smoothing filter should be applied to an ultrasound image depending on the output of an edge detection filter. The edge detection filter determines if an image pixel belongs to an edge or belongs in the middle of the homogeneous tissue area. The magnitude of the edge detection filter output is used to determine if the pixel belongs to an edge or a 'strong' or 'steep' edge. If the pixel belongs to a homogeneous tissue area, a smoothing filter is applied to the pixel. The ultrasound image may comprise one or more, or a combination of, any type of ultrasound images including but not limited to B-mode tissue images, Doppler spectrum images, blood flow images, elasticity images, and any form of grayscale or intensity images, and combinations comprising at least one of the foregoing images, and the like, derived from ultrasound signals that make up the image.

Edges of an object or organ have directions. Therefore, edge detection needs to be performed in directions. With reference to FIGS. 5a-5h, there are illustrated edge detection filters in 8 directions (−45°, 45°, 67.5°, 22.5°, −67.5°, −22.5°, 0°, 90°, respectively) of the present invention. Each filter is implemented so as to produce the effect of low-pass filtering as the size of each filter is large and is capable of detecting edges reliably with a better signal to noise ratio than that of the prior art. Yet, unlike the edge detection filter after low-pass filtering of the prior art, the present invention applies the operation of differentiation to image pixels which are not overriding each other. To illustrate this problem of the pre-processing of a low-pass filter, a 1×3 edge detection filter 31 of the horizontal direction, which is a part (or column) of the filter 11 in FIG. 1a, is shown in FIG. 3a. Using three columns of the filter 11 yields an effect of averaging and a higher signal to noise ratio of detecting edges. However, for simplicity, the edge detection filter 31 in FIG. 3a is used to illustrate the overriding problem. FIG. 3b shows a 5×5 low-pass filter 33 which is applied to an image before the edge detection filter 31. FIG. 3c shows the combination of the edge detection filter's 31 filter coefficient value of −1 and the low-pass filter 33 filter coefficient values while FIG. 3d shows the combination of the edge detection filter's 31 filter coefficient value of 1 and the low-pass filter 33 filter coefficient values. The filter's 31 filter coefficient value of 0 has no effects or no output. FIG. 3e shows the overall effect of the combination of edge detection filter 31 and the low-pass filter 33 on the original image. The center three rows are overridden and the filter coefficients cancel each other and become 0. The center three rows of zero act like an edge detection filter of a spatial resolution of approximately 3 times worse than the original filter of a 1×3 filter having only one row of zeros. Therefore, the detected edge will be fuzzy. To maintain the spatial resolution (sharpness) and registration (position) of the edge, the row of coefficients 0 should be as narrow as possible. Three rows of zeros are two rows too many for coefficients of 0. An improved edge detection filter 41 is shown for the same size array (7×5) in FIG. 4. This improved filter 41 is more accurate in detecting the position of the edge than is that of FIG. 3e and yet has better signal to noise ratio (SNR) in detecting the edge as it has a feature of low-pass filtering in the upper and lower areas surrounding the row of 0. Usually, an edge detection filter is applied to an image with the result of the filter operation assigned to a pixel representing the center of the edge detection filter. Typically, when the edge detection filter is centered on an edge, the value of the center pixel is of a large relative magnitude.

Referring now to FIGS. 5a-5h, eight edge detection filters of the present invention are shown. The number of filters or directions may be extended to twenty or more with the eight exemplary filters shown in FIGS. 5a-5h. Twenty filters can be designed with a step, or increment, of approximately nine degrees in direction. Edge detection filters 51-59 have filter coefficient values at the intersection of each row and column comprising an integer value, for example, 1, −1 or 0, to provide for quick calculation. Filter coefficient values of 1, −1 or 0 do not require multiplication but, rather, may be applied to an image using only addition and subtraction. However, filter coefficient values are not necessarily restricted to integers but may also be decimal values or floating-point numbers. Filter coefficients of all these filters 51-59 are symmetrical, with the exception of the sign, that is, plus (+) or minus (−), either vertically, horizontally or in the direction of the edge that the filter is designed to detect. It should be noted that the center positions are all 0. For example, filter coefficients of the center row are all 0 for a horizontal edge detecting filter as illustrated in FIG. 5g. Filter coefficients of the center column are all 0 for a vertical edge detecting filter as shown in FIG. 5h. Note that, with the exception of directions of 0°, 90°, 45°, and −45°, the zero coefficients of the edge detection filter 51 are located in the row and column positions aligned with a detection direction 57.

Edge detection filters with many directions are ideal for detecting edges with great accuracy and sensitivity for the directions but are somewhat limited for real-time implementation. Each filter requires many calculations for a given image and the number of overall calculations increases with the number of filters. Therefore, an alternative embodiment of the present invention uses only 2 filters, that is, one of the vertical direction and one of the horizontal direction. Edges of other directions are detected using a filter size (2M+1)×(2N+1) as follows:

$$R_X = -\sum_{\substack{i=1 \\ j=1}}^{\substack{i=2M+1 \\ j=N}} z_{i,j} + \sum_{\substack{i=1 \\ j=N+2}}^{\substack{i=2M+1 \\ j=2N+1}} z_{i,j} \tag{1}$$

$$R_Y = \sum_{j=1}^{j=2N+1} \left( -\sum_{i=1}^{i=M} z_{i,j} + \sum_{i=M+2}^{i=2M+1} z_{i,j} \right) \tag{2}$$

where M and N are integers and can be equal to each other. $Z_{i,j}$ is the image value to which the filter is applied at a point (i,j), and $R_X$ and $R_Y$ are the filter outputs in the horizontal and vertical directions, respectively.

The direction of the edge is determined by $$\vartheta = \tan^{-1}\frac{R_Y}{R_X} \tag{3}$$

The magnitude or strength of the edge is determined by $$\text{magnitude} = (R_X^2 + R_Y^2)^{0.5} \approx |R_X| + |R_Y| \tag{4}$$

The magnitude of the combined horizontal ($R_x$) and vertical ($R_y$) edge detection results is indicative of the presence of an edge.

The use of these 2 edge detection filters alone speed up the processing by a factor of 10 compared with the use of 20 filters as disclosed in the prior art. Furthermore, the use of these 2 edge detection filters makes it possible to further speed up the processing by reducing the number of identical calculations performed at different filter positions. For example, for a filter mask size of about 11×11, this increase in speed can be as much as 10 times as described in the following sections. Therefore, combining this speed increase with the decrease in the number of filters utilized, the overall increase in the speed may be as much as 100 times faster. This makes real-time implementation of image processing possible.

One exemplary method of the present invention to speed up the calculations required to apply one or more edge detection filters of the present invention involves iteration. A general form of the edge detection filter can be expressed by $$R = \sum_{\substack{i=1 \\ j=1}}^{\substack{i=2M+1 \\ j=2N+1}} w_{ij} z_{ij} \tag{5}$$

where i represents an x-coordinate and j represents a y-coordinate in the filter mask; M, N are integers; R represents the filter output; $w_{ij}$ represents the filter coefficients at coordinates (i,j); and, $z_{ij}$ represents the image values at coordinates (i,j).

For the horizontal edge detection filter 58 shown in FIG. 5g, the filter can be expressed as follows, $$R_X = -\sum_{\substack{i=1, \\ j=1}}^{\substack{i=2M+1 \\ j=N}} z_{i,j} + \sum_{\substack{i=1 \\ j=N+2}}^{\substack{i=2M+1 \\ j=2N+1}} z_{i,j} \tag{6}$$

And this can be further expressed for each row as follows, $$R_{X,1} = \sum_{i=1}^{i=2M+1} z_{i,1} \tag{7}$$

$$R_{X,2} = \sum_{i=1}^{i=2M+1} z_{i,2} \tag{8}$$

...
...

$$R_{X,2N+1} = \sum_{i=1}^{i=2M+1} z_{i,2N+1} \tag{9}$$

Then the result of each row calculation is summed as follows, $$R_X = -\sum_{j=1}^{j=N} R_{X,j} + \sum_{j=N+2}^{j=2N+1} R_{X,j} \quad (10)$$

where the center row (j=N+1) coefficient is 0.

Figure 11:
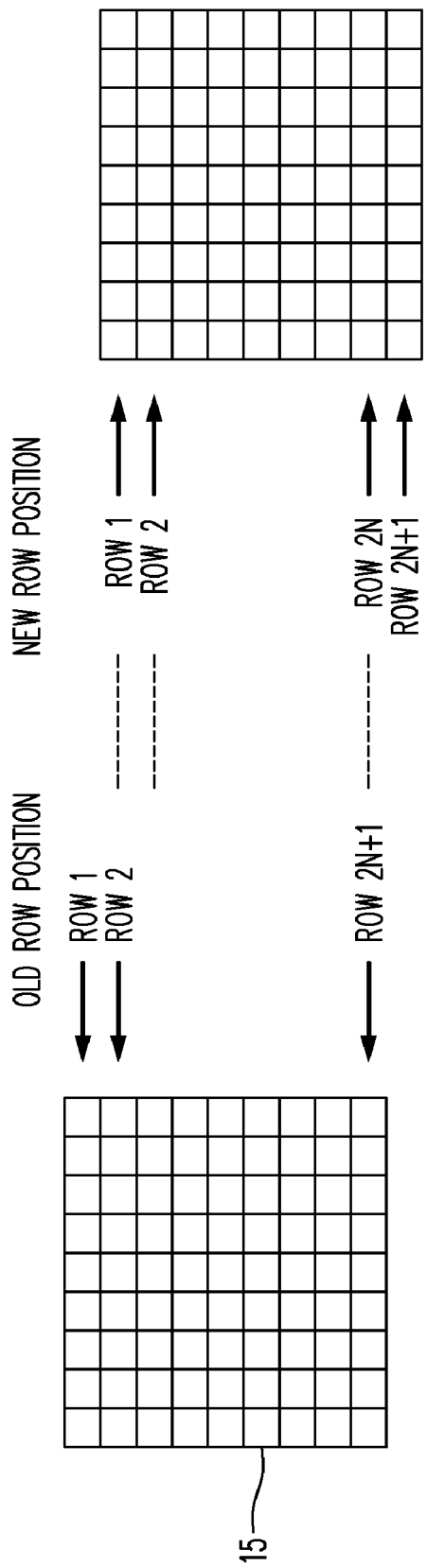
FIG. 11 is a diagram depicting the relationship between old and new filter positions.
Figure 12:
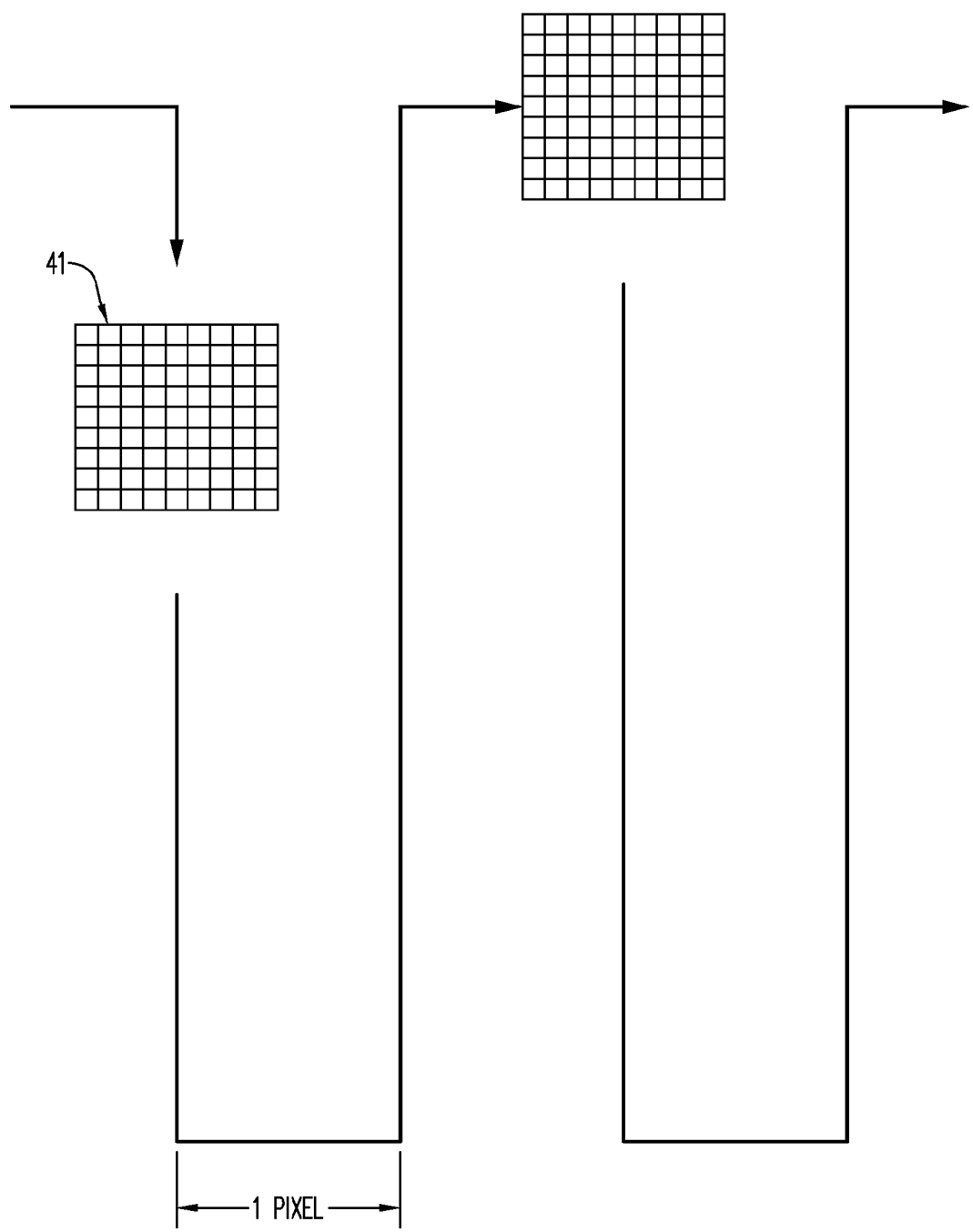
FIG. 12 illustrates the movement of an exemplary filter of the present invention across an ultrasound image.

In order to speed up the filter calculation for the whole image area 10 of many filter positions 13, 13' as illustrated in FIG. 12. Once the filter 15 at the first position was calculated, the filter at the next position (as the filter moves one row down) is efficiently calculated by shifting the content of memories by one and calculating only the newest row. This is schematically illustrated in FIG. 11. The memory contents are shifted as follows, $$R_{X,1} \leftarrow R_{X,2} \quad (11)$$

$$R_{X,2} \leftarrow R_{X,3} \quad (12)$$

...

...

$$R_{X,2N} \leftarrow R_{X,2N+1} \quad (13)$$

Finally, the newest row is calculated as follows, $$R_{X,2N+1} = \sum_{i=1}^{i=2M+1} z_{i,2N+1} \quad (14)$$

Then these terms or the contents of the memories are summed as follows, $$R_X = -\sum_{j=1}^{j=N} R_{X,j} + \sum_{j=N+2}^{j=2N+1} R_{X,j} \quad (15)$$

Figure 9B:
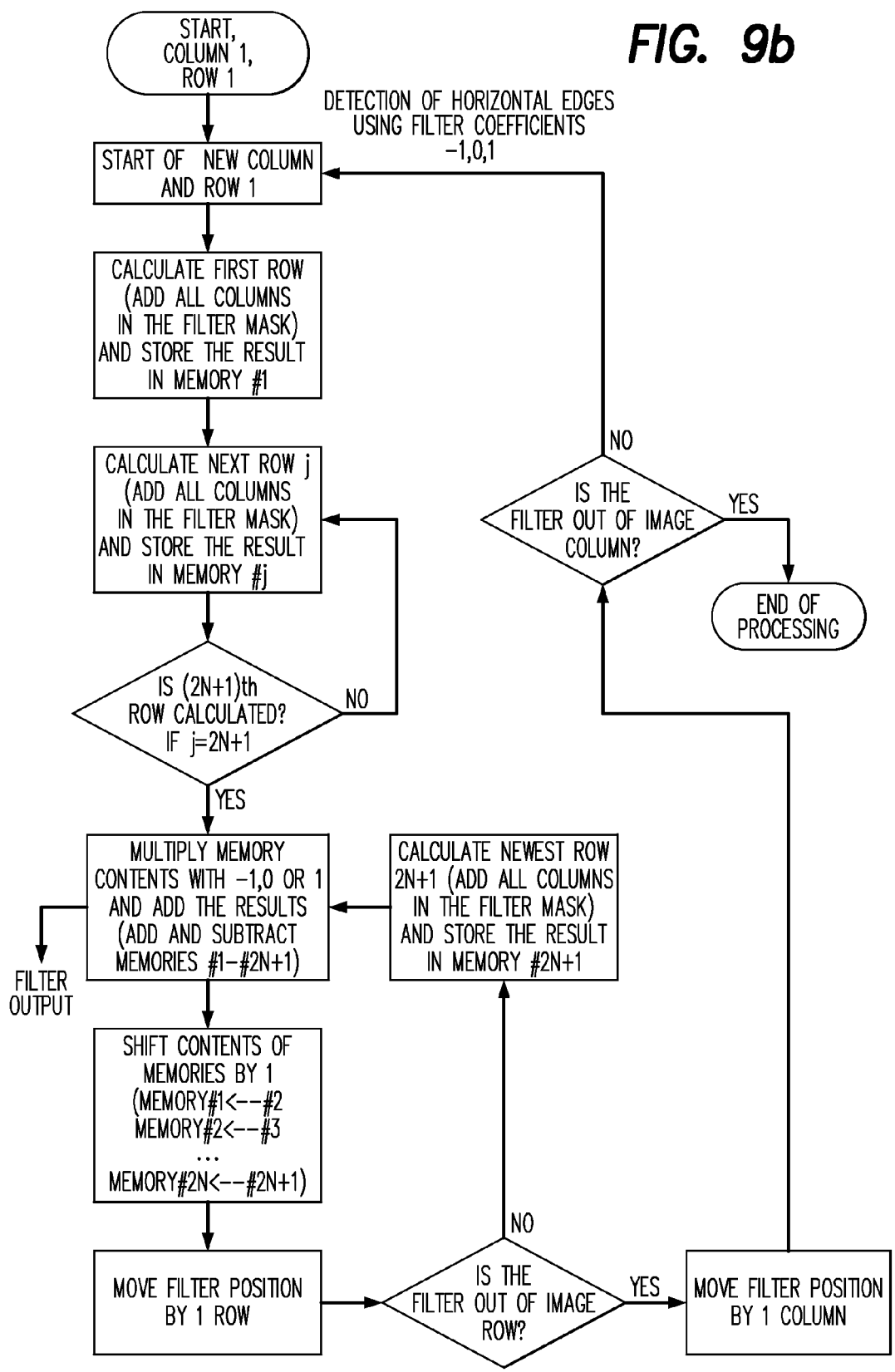
FIG. 9b illustrates a flow chart for a method of detecting a horizontal edge using a set of filter coefficients (−1, 0, 1) in accordance with the present invention.
Figure 15:
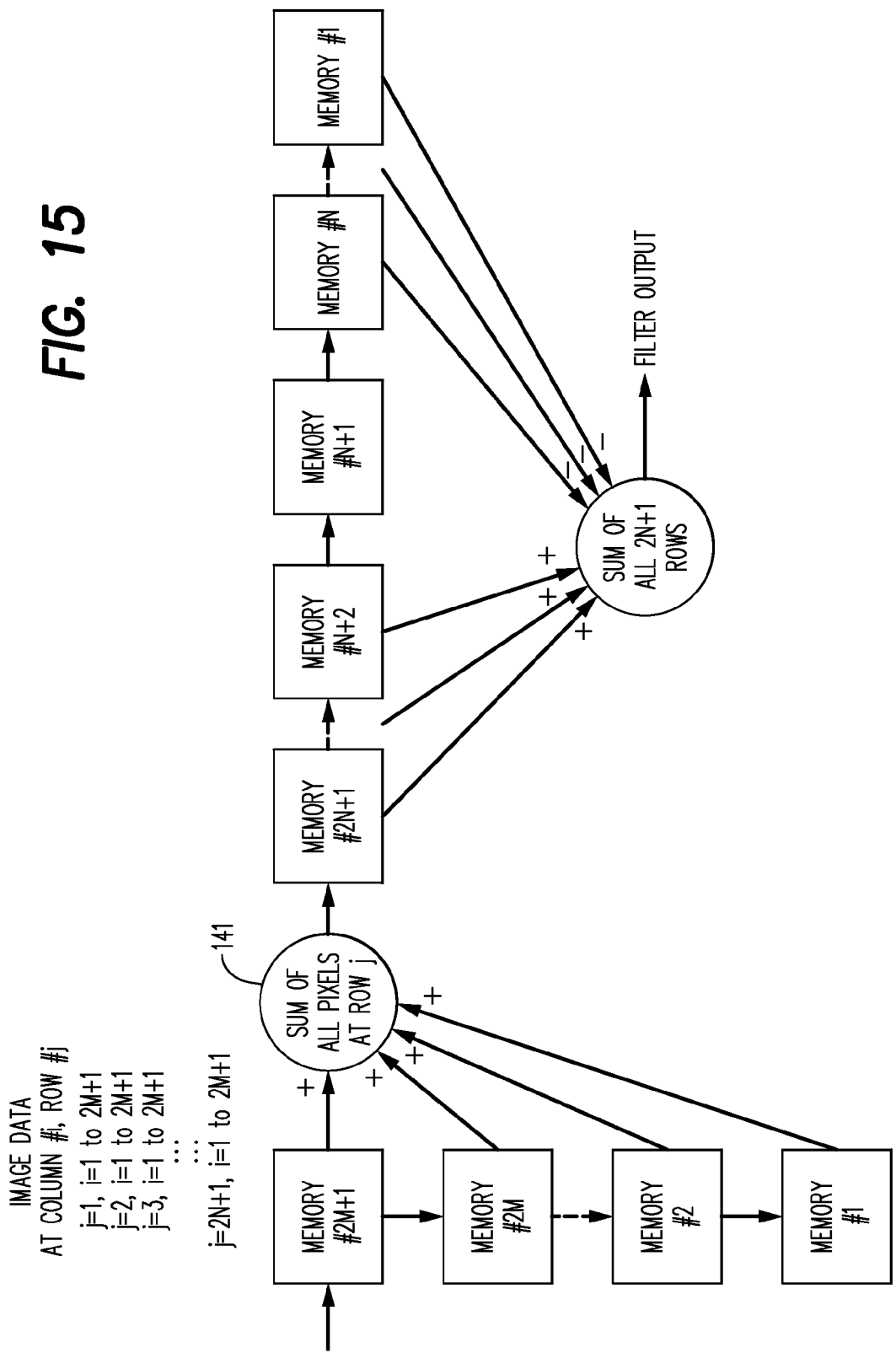
FIG. 15 is a diagram of an exemplary embodiment of a horizontal edge detection filter hardware of the present invention.

This efficient filter calculation may be illustrated in the flow chart shown in FIG. 9b. The calculation may be illustrated using a horizontal edge detection filter such as edge detection filter 58 illustrated in FIG. 5g. As shown in FIG. 9b, the method of performing edge detection using the horizontal edge detection filter consisting of coefficients −1, 0 and 1 begins at the starting column 1, row 1 of an image. First, the first row may be calculated by adding all of the columns in the image corresponding to the columns in the edge detection filter and storing the results in memory #1. Then, the next row j may be calculated by adding all corresponding columns in the edge detection filter and storing the result in memory #j. These steps may be repeated until the $(2N+1)^{th}$ row is calculated. Once row j=2N+1, the memory contents are added or subtracted as necessary depending upon the sign (+/−) of the filter coefficients and the results are summed from memories #1 through #2N+1. The result of this calculation is outputted as the filter output. Next, the memories are shifted as illustrated and described in FIG. 11. Returning now to FIG. 9b, the edge detection filter 58 may then be moved downwards on the image by one row. A check is then performed to make sure that edge detection filter 58 is not beyond a boundary of the row or of the image. If filter 58 is beyond either boundary, the filter is moved over by one column and the process is begun once again at the new column and at row 1. In addition, a check is performed to make sure that the edge detection filter is not beyond a boundary of the column or of the image. If filter 58 is beyond either boundary, then the processing ends. If, however edge detection filter 58 is not beyond either boundary, the newest row 2N+1 is calculated and the results stored in memory #2N+1. Once again the memory contents of memories #1 through 2N+1 are added or subtracted depending on the sign of the filter coefficients to obtain the filter output result. This process is illustrated in FIG. 15 as an exemplary electronic circuit diagram demonstrating the efficient calculation of the horizontal edge detection filter. As depicted, image pixel data may be read out from image memory and fed to memory #2M+1 and shifted to memory #2M, ... #1. All pixel data forming the image in the same row may be summed at the summer 141 and the summer's 141 output may be fed to memory #2N+1 and shifted to memory #N+2, ... #1. The contents of memory #2N+1 to #N+2 are added while the contents of memory #N to #1 are subtracted at the summer in order to calculate the filter output. Although edge detection filter 58 has been illustrated with reference to advancing vertically from the top to the bottom of an image by single units, and then advancing from the left to the right one unit at a time, and then repeating the process, the exemplar filters of the present invention are not so limited. Rather, the edge detection filters of the present invention are drawn broadly to moving in two orthogonal directions, preferably from top to bottom and from left to right.

This can be extended to a more general form of the edge detection filter of coefficients 61, 63 as shown in FIGS. 6a-b, where "a" can be an integer or floating-point of positive or negative value. Another exemplary efficient filter operation is described in the following section.

For the horizontal edge direction, after calculating the rows as if all the coefficients are 1, the row results are multiplied by the coefficient of a, whereby multiplying each row result is more efficient than multiplying each pixel data.

$$R_X = -a\sum_{j=1}^{j=N} R_{X,j} + a\sum_{j=N+2}^{j=2N+1} R_{X,j} \quad (16)$$

$$R_{X,1} = \sum_{i=1}^{i=2M+1} z_{i,1} \quad (17)$$

$$R_{X,2} = \sum_{i=1}^{i=2M+1} z_{i,2} \quad (18)$$

...

...

$$R_{X,2N+1} = \sum_{i=1}^{i=2M+1} z_{i,2N+1} \quad (19)$$

$$R_X = -a\sum_{j=1}^{j=N} R_{X,j} + a\sum_{j=N+2}^{j=2N+1} R_{X,j} \quad (20)$$

Once the horizontal edge detection filter was calculated for the first position, the content of the memories are shifted by one and only the newest row is calculated as the filter moves down one row.

$$R_{X,1} \leftarrow R_{X,2} \quad (21)$$

$$R_{X,2} \leftarrow R_{X,3} \quad (22)$$

...

...

$$R_{X,2N} \leftarrow R_{X,2N+1} \quad (23)$$

Again, only the newest row may be calculated as follows $$R_{X,2N+1} = \sum_{i=1}^{i=2M+1} z_{i,2N+1} \qquad (24)$$

Then, the terms may be summed.

$$R_X = -a\sum_{j=1}^{j=N} R_{X,j} + a\sum_{j=N+2}^{j=2N+1} R_{X,j} \qquad (25)$$

Figure 10A:
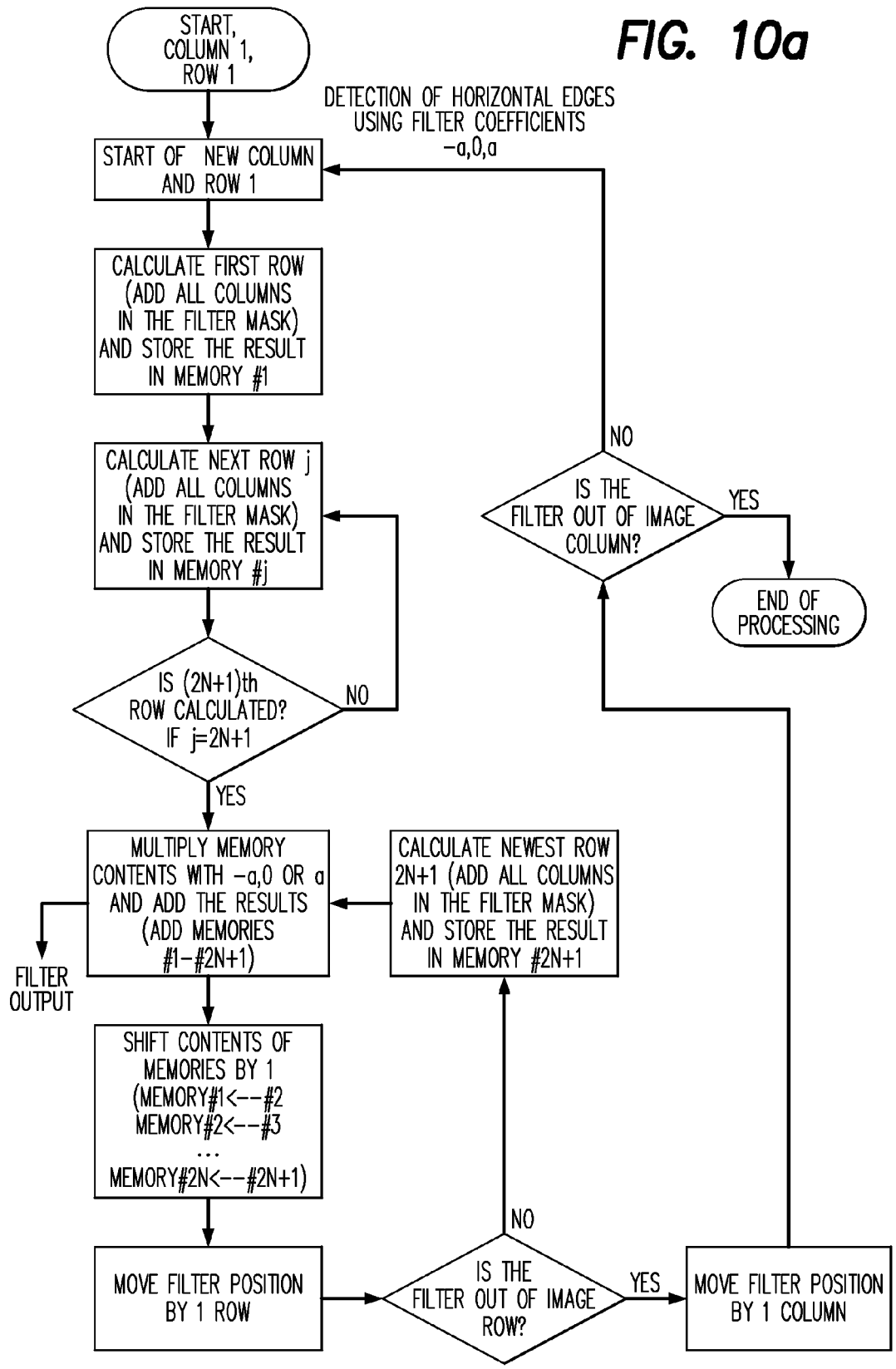
FIG. 10a illustrates a flow chart for a method for detecting a horizontal edge using a set of filter coefficients (−a, 0, a) in accordance with the present invention.
Figure 10B:
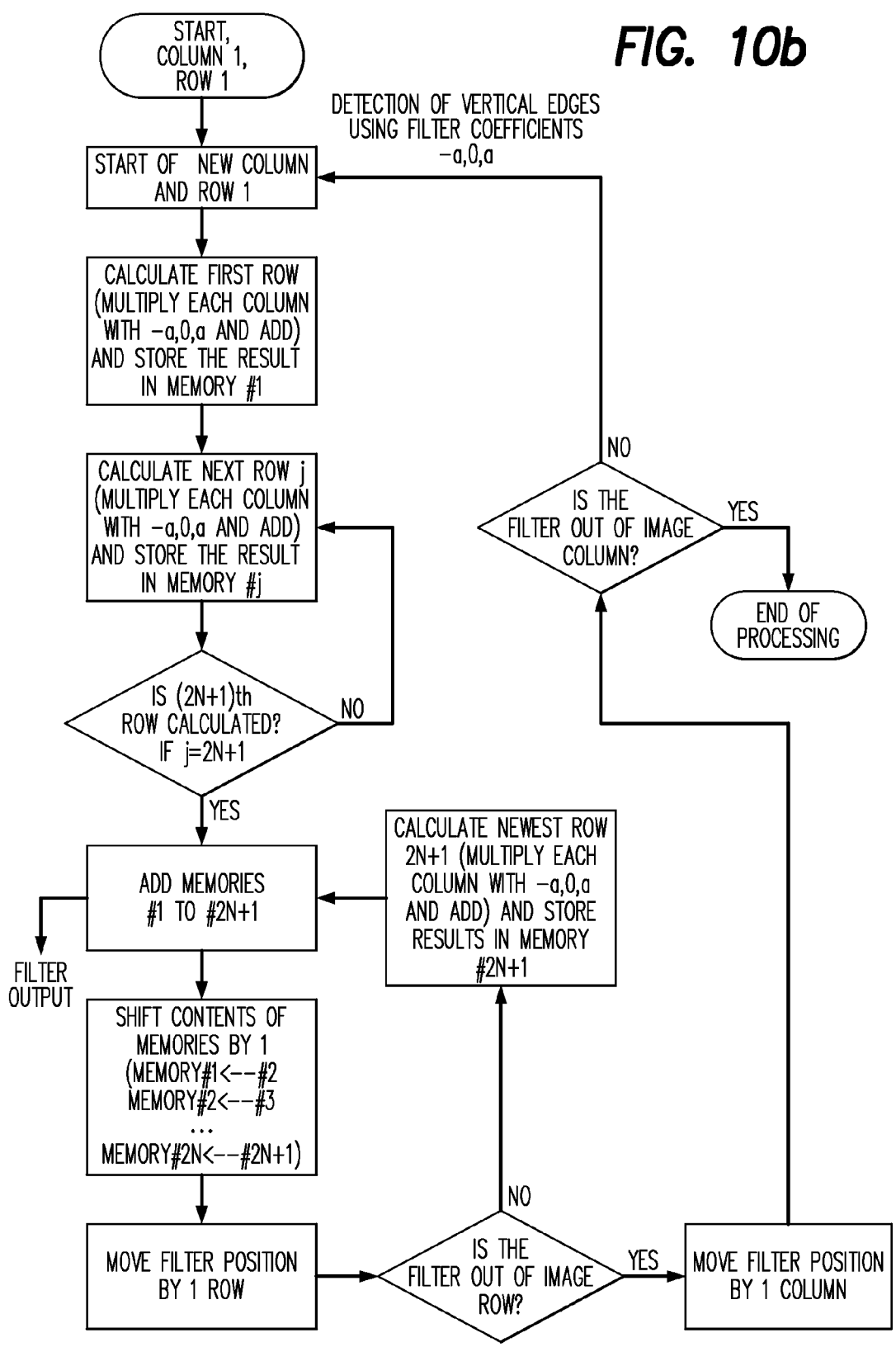
FIG. 10b illustrates a flow chart for detecting a vertical edge using a set of filter coefficients (−a, 0, a) in accordance with the present invention.

This efficient calculation is illustrated by the flowchart shown in FIG. 10a, where a may be 1, −1 or other filter coefficient values as mentioned earlier.

A similar iteration technique can be used to calculate R efficiently for a more general filter using $a_j$ $$R_X = -\sum_{j=1}^{j=N} a_j R_j + \sum_{j=N+2}^{j=2N+1} a_{2N+2-j} R_j \qquad (26)$$

This can be efficiently calculated as follows $$R_{X,1} = \sum_{i=1}^{i=2M+1} z_{i,1} \qquad (27)$$

$$R_{X,2} = \sum_{i=1}^{i=2M+1} z_{i,2} \qquad (28)$$

...
...

$$R_{X,2N+1} = \sum_{i=1}^{i=2M+1} z_{i,2N+1} \qquad (29)$$

$$R_X = -\sum_{j=1}^{j=N} a_j R_{X,j} + \sum_{j=N+2}^{j=2N+1} a_{2N+2-j} R_{X,j} \qquad (30)$$

Once the filter in the first position was calculated, we may shift the content of memories by one and calculate the newest row as the filter moves down one row.

$$R_{X,1} \leftarrow R_{X,2} \qquad (31)$$

$$R_{X,2} \leftarrow R_{X,3} \qquad (32)$$

...

...

$$R_{X,2N} \leftarrow R_{X,2N+1} \qquad (33)$$

Again, only the newest row may be calculated as follows $$R_{X,2N+1} = \sum_{i=1}^{i=2M+1} z_{i,2N+1} \qquad (34)$$

Then, the terms may be summed.

$$R_X = -\sum_{j=1}^{j=N} a_j R_{X,j} + \sum_{j=N+2}^{j=2N+1} a_{2N+2-j} R_{X,j} \qquad (35)$$

The filter continues to move down one row and the calculation continues until the filter position moves beyond the image row or the image boundary. The filter position then moves to the first row of the next column position and continues the same operation.

For vertical edges, the filter in FIG. 5h may be expressed by $$R_Y = \sum_{j=1}^{j=2N+1}\left(-\sum_{i=1}^{i=M} z_{i,j} + \sum_{i=M+2}^{i=2M+1} z_{i,j}\right) \qquad (36)$$

This calculation can be efficiently executed by an iteration technique as described before.

$$R_{Y,1} = -\sum_{i=1}^{i=M} z_{i,1} + \sum_{i=M+2}^{i=2M+1} z_{i,1} \qquad (37)$$

$$R_{Y,2} = -\sum_{i=1}^{i=M} z_{i,2} + \sum_{i=M+2}^{i=2M+1} z_{i,2} \qquad (38)$$

...
...

$$R_{Y,2N+1} = -\sum_{i=1}^{i=M} z_{i,2N+1} + \sum_{i=M+2}^{i=2M+1} z_{i,2N+1} \qquad (39)$$

$$R_Y = \sum_{j=1}^{j=2N+1} R_{Y,j} \qquad (40)$$

Once the filter in the first position is calculated, the filter in the next position may be calculated by only shifting the contents of memories and calculating only the newest row as follows, $$R_{Y,1} \leftarrow R_{Y,2} \qquad (41)$$

$$R_{Y,2} \leftarrow R_{Y,3} \qquad (42)$$

...

...

$$R_{Y,2N} \leftarrow R_{Y,2N+1} \qquad (43)$$

and only the newest row is calculated as follows, $$R_{Y,2N+1} = -\sum_{i=1}^{i=M} z_{i,2N+1} + \sum_{i=M+2}^{i=2M+1} z_{i,2N+1} \qquad (44)$$

This operation is depicted in FIG. 11. Furthermore, the flowchart in FIG. 9a describes the iteration method at many positions in the whole image area. The method illustrated in FIG. 9a is quite similar to that illustrated above in FIG. 9b. The primary difference between these exemplary methods arises from the slightly different calculations with regard to the arrangement of the vertical edge detection filter coefficients −1, 0, 1. It should be emphasized at this point that the present invention is directed to the use of horizontal and vertical edge detection filters of any size having an arrangement of coefficients as illustrated in FIGS. 5g and 5h. It would be evident to one skilled in the art to expand the application of any horizontal or vertical edge detection filter configured as are those defined by the present invention using the same methodology outlined herein.

Figure 13:
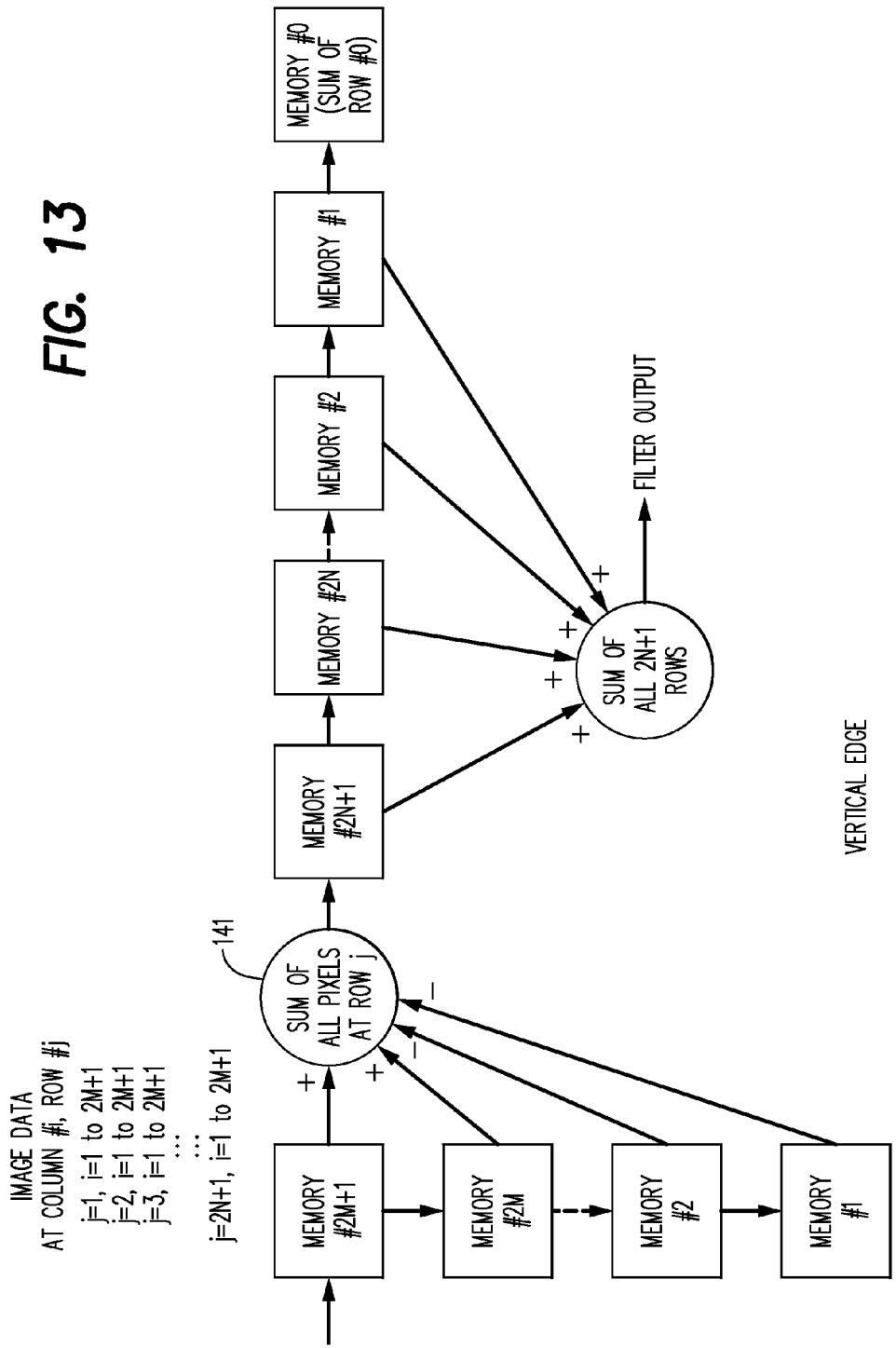
FIG. 13 is a block diagram of an exemplary embodiment of a vertical edge detection filter hardware of the present invention.

Returning again to FIG. 9*a*, a vertical edge detection filter may be applied at column 1, row 1 to the image. The first row may be calculated through summation by adding or subtracting image pixels values, depending on the filter coefficient values, i.e. −1, 0 or 1, and further storing the results of the summation in memory #1. Next, row j may be calculated through summation by adding and subtracting image pixels values, depending on the filter coefficient values, i.e., −1, 0 or 1, and further storing the results in memory j. As described before with reference to FIG. 9*b*, a check may then be performed to determine if the $(2N+1)^{th}$ row has been calculated. If not, the next row j may be calculated, and the next rows may continue to be calculated in an interactive fashion until the $(2N+1)^{th}$ row is calculated. When j=2N+1, all of the memories are summed from memory #1 to memory #2N+1. The resulting summation results in the filter output. The memories are then shifted as described above with reference to the horizontal edge detection filter. The filter may be moved by one row, a check is performed to see if the filter is out of the image row, and if not, the newest row 2N+1 may be calculated through summation by adding and subtracting image pixel values, depending on the filter coefficient values, i.e., −1, 0 or 1, and storing the results in memory #2N+1. FIG. 13 illustrates an exemplary diagram of electronic circuits demonstrating the exemplary method of the present invention to efficiently calculate the vertical edge detection filter output. All image pixels data in the same row are read out from image memory and fed to memory #2M+1, and shifted to memory #2M, . . . and #1. The image pixel data in the same row may be summed or subtracted at the summer. All pixels data of the next row may be read out and summed at the summer in the same fashion. This operation continues until the last row of the filter for one filter position. The output, or result, of the summer may be fed to memory #2N+1 and shifted to memory #2N, . . . and #1. The contents of the memory #2N+1 to 1 may be summed to calculate the filter output.

The filter is moved down by one row position and the filter calculation continues until the filter goes beyond the image row or image boundary.

As described earlier, the filter coefficient values are not limited to −1, 0, 1 and can take a general form using a, or aj as shown below in Equation 45

$$R_Y = \sum_{j=1}^{j=2N+1} \left( -a \sum_{i=1}^{i=M} z_{i,j} + a \sum_{i=M+2}^{i=2M+1} z_{i,j} \right) \quad (45)$$

where a can also equal 1, −1 or other values. Again, this filter can be efficiently calculated using the iteration technique as described before. The first row to 2N+1 row in the filter mask are calculated as follows, $$R_{Y,1} = -a\sum_{i=1}^{i=M} z_{i,1} + a\sum_{i=M+2}^{i=2M+1} z_{i,1} \quad (46)$$

$$R_{Y,2} = -a\sum_{i=1}^{i=M} z_{i,2} + a\sum_{i=M+2}^{i=2M+1} z_{i,2} \quad (47)$$

. . .
. . .

$$R_{Y,2N+1} = -a\sum_{i=1}^{i=M} z_{i,2N+1} + a\sum_{i=M+2}^{i=2M+1} z_{i,2N+1} \quad (48)$$

$$R_Y = \sum_{j=1}^{j=2N+1} R_{Y,j} \quad (49)$$

As the filter is moved down by one row, the iteration operation may be used as follows.

$$R_{Y,1} \leftarrow R_{Y,2} \quad (50)$$

$$R_{Y,2} \leftarrow R_{Y,3} \quad (51)$$

. . .

. . .

$$R_{Y,2N} \leftarrow R_{Y,2N+1} \quad (52)$$

and only the newest row may be calculated as follows, $$R_{Y,2N+1} = -a\sum_{i=1}^{i=M} z_{i,2N+1} + a\sum_{i=M+2}^{i=2M+1} z_{i,2N+1} \quad (53)$$

Using $a_i$ $$R_Y = \sum_{j=1}^{j=2N+1} \left( -\sum_{i=1}^{i=M} a_i z_{i,j} + \sum_{i=M+2}^{i=2M+1} a_{2M+2-i} z_{i,j} \right) \quad (54)$$

$$R_{Y,1} = -\sum_{i=1}^{i=M} a_i z_{i,1} + \sum_{i=M+2}^{i=2M+1} a_{2M+2-i} z_{i,1} \quad (55)$$

$$R_{Y,2} = -\sum_{i=1}^{i=M} a_i z_{i,2} + \sum_{i=M+2}^{i=2M+1} a_{2M+2-i} z_{i,2} \quad (56)$$

. . .
. . .

$$R_{Y,2N+1} = -\sum_{i=1}^{i=M} a_i z_{i,2N+1} + \sum_{i=M+2}^{i=2M+1} a_{2M+2-i} z_{i,2N+1} \quad (57)$$

$$R_Y = \sum_{j=1}^{j=2N+1} R_{Y,j} \quad (58)$$

As the filter is moved down by one row, the iteration operation may be used as follows:

$$R_{Y,1} \leftarrow R_{Y,2} \quad (59)$$

$$R_{Y,2} \leftarrow R_{Y,3} \quad (60)$$

. . .

$$R_{Y,2N} \leftarrow R_{Y,2N+1} \quad (61)$$

and only the newest row may be calculated as follows, $$R_{Y,2N+1} = -\sum_{i=1}^{i=M} a_i z_{i,2N+1} + \sum_{i=M+2}^{i=2M+1} a_{2M+2-i} z_{i,2N+1} \quad (62)$$

Other forms of iteration may be also used to speed up the filter calculation in the whole image area as will be recognized by one skilled in the art. For example, for the vertical edges, after calculating the filter result in the first position, the next row position may be calculated by adding the new row to the result of the first position and subtracting the last row in the first position. The vertical edge detection filter may be calculated as follows, $$R_Y = \sum_{j=1}^{j=2N+1} \left( -\sum_{i=1}^{i=M} z_{i,j} + \sum_{i=M+2}^{i=2M+1} z_{i,j} \right) \quad (63)$$

This result $R_Y$ is stored in memory. The calculation result of each row expressed below may also be stored in memory #1 to #2N+1.

$$R_{Y,1} = -\sum_{i=1}^{i=M} z_{i,1} + \sum_{i=M+2}^{i=2M+1} z_{i,1} \quad (64)$$

$$R_{Y,2} = -\sum_{i=1}^{i=M} z_{i,2} + \sum_{i=M+2}^{i=2M+1} z_{i,2} \quad (65)$$

...
...

$$R_{Y,2N+1} = -\sum_{i=1}^{i=M} z_{i,2N+1} + \sum_{i=M+2}^{i=2M+1} z_{i,2N+1} \quad (66)$$

Next, the filter moves down by one row and the filter of the new position may be calculated as described below. First, the contents of the memories may be shifted as follow, $$R_{Y,0} \leftarrow R_{Y,1} \quad (67)$$

$$R_{Y,1} \leftarrow R_{Y,2} \quad (68)$$

$$R_{Y,2} \leftarrow R_{Y,3} \quad (69)$$

...

...

$$R_{Y,2N} \leftarrow R_{Y,2N+1} \quad (70)$$

$$R_Y \leftarrow (R_Y - R_{Y,0} + R_{Y,2N+1}) \quad (71)$$

where the symbol ← indicates storing the right hand term into the left hand term; $R_{Y,0}$ indicates the first row result of the previous position; and, $R_{Y,2N+1}$ of the last operation indicates the newest calculation result for the newest row. This calculation of the newest row $R_{Y,2N+1}$ is actually carried out. However, the summing operation requires only one addition and one subtraction of the row results rather than 2N+1 additions of the previous iteration method. The $R_Y$ value from the previous position and stored in the memory may be used and updated by the summing operation and stored in the memory again. This iteration technique may be extended to filter coefficients of a or aj just like before. This operation of adding the newest row and subtracting the oldest row is best illustrated in FIG. 11.

Figure 14:
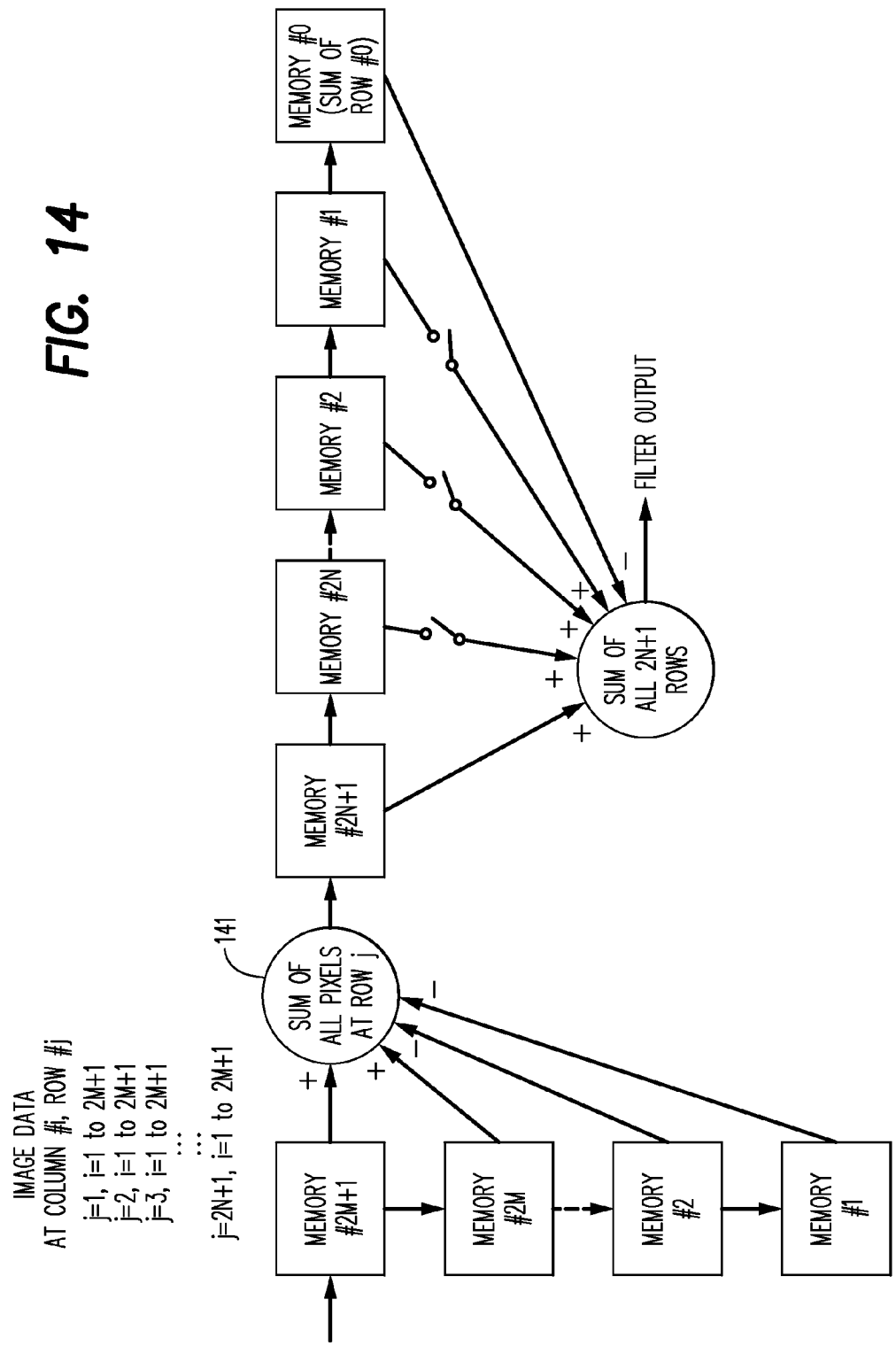
FIG. 14 is a diagram of an exemplary embodiment of an efficient vertical edge detection filter of the present invention.

FIG. 14 illustrates yet another exemplary diagram of electronic circuits depicting the exemplary methods of the present invention. The electronic circuits may comprise memory locations, accumulators, summers, multipliers, adders, digital signal processors, memory storage devices, combinations comprising at least one of the foregoing, and the like, to efficiently calculate this vertical edge detection filter. While diagrammed with reference to such physical circuit components, it is recognized that the operations of the present invention may be performed in whole, or in part, by a digital signal processor (DSP). All pixels (image) data in the same row may be read out from image memory and fed to memory #2M+1 and shifted to memory #2M, . . . and #1. The pixel data in the same row may be summed or subtracted at the summer 141. All pixels data of the next row are read out and summed at the summer in the same fashion. This operation continues until reaching the last row of the filter for one filter position. The output (result) of the summer is fed to memory #2N+1 and shifted to memory #2N, . . . and #0. For the first filter position, the contents of the memory #2N+1 to 1 are summed to calculate the filter output as switches of memory #1 to 2N+1 are all closed but switch of memory #0 is open. For the next filter position, switches of memory #0 and #2N+1 are closed while switches of memory #1 to #2N are open to calculate the new filter output by adding the newest row data (memory #2N+1) and subtracting the oldest row (memory #0) from the previous filter result, or output, of the summer's content.

As described earlier, the horizontal edge detection filter may be efficiently calculated as follows.

$$R_X = -\sum_{\substack{i=1, \\ j=1}}^{\substack{i=2M+1 \\ j=N}} z_{i,j} + \sum_{\substack{i=1 \\ j=N+2}}^{\substack{i=2M+1 \\ j=2N+1}} z_{i,j} \quad (72)$$

$$R_{X,1} = \sum_{i=1}^{i=2M+1} z_{i,1} \quad (73)$$

$$R_{X,2} = \sum_{i=1}^{i=2M+1} z_{i,2} \quad (74)$$

...
...

$$R_{X,2N+1} = \sum_{i=1}^{i=2M+1} z_{i,2N+1} \quad (75)$$

$$R_X = -\sum_{j=1}^{j=N} R_{X,j} + \sum_{j=N+2}^{j=2N+1} R_{X,j} \quad (76)$$

The filter output of the first position may be stored in memory. Also, the calculation results of each row may be stored in memories #1 to #2N+1. Then the filter is moved down by one row and the filter output in the new position may be efficiently calculated as follows. First the contents of memories #1 to #2N+1 may be shifted as follows, $$R_{X,0} \leftarrow R_{X,1} \quad (77)$$

$$R_{X,1} \leftarrow R_{X,2} \quad (78)$$

$$R_{X,2} \leftarrow R_{X,3} \quad (79)$$

...

...

$$R_{X,2N} \leftarrow R_{X,2N+1} \quad (80)$$

$$R_X \leftarrow (R_X + R_{X,0} - R_{X,N} - R_{X,N+1} + R_{X,2N+1}) \quad (81)$$

Figure 16:
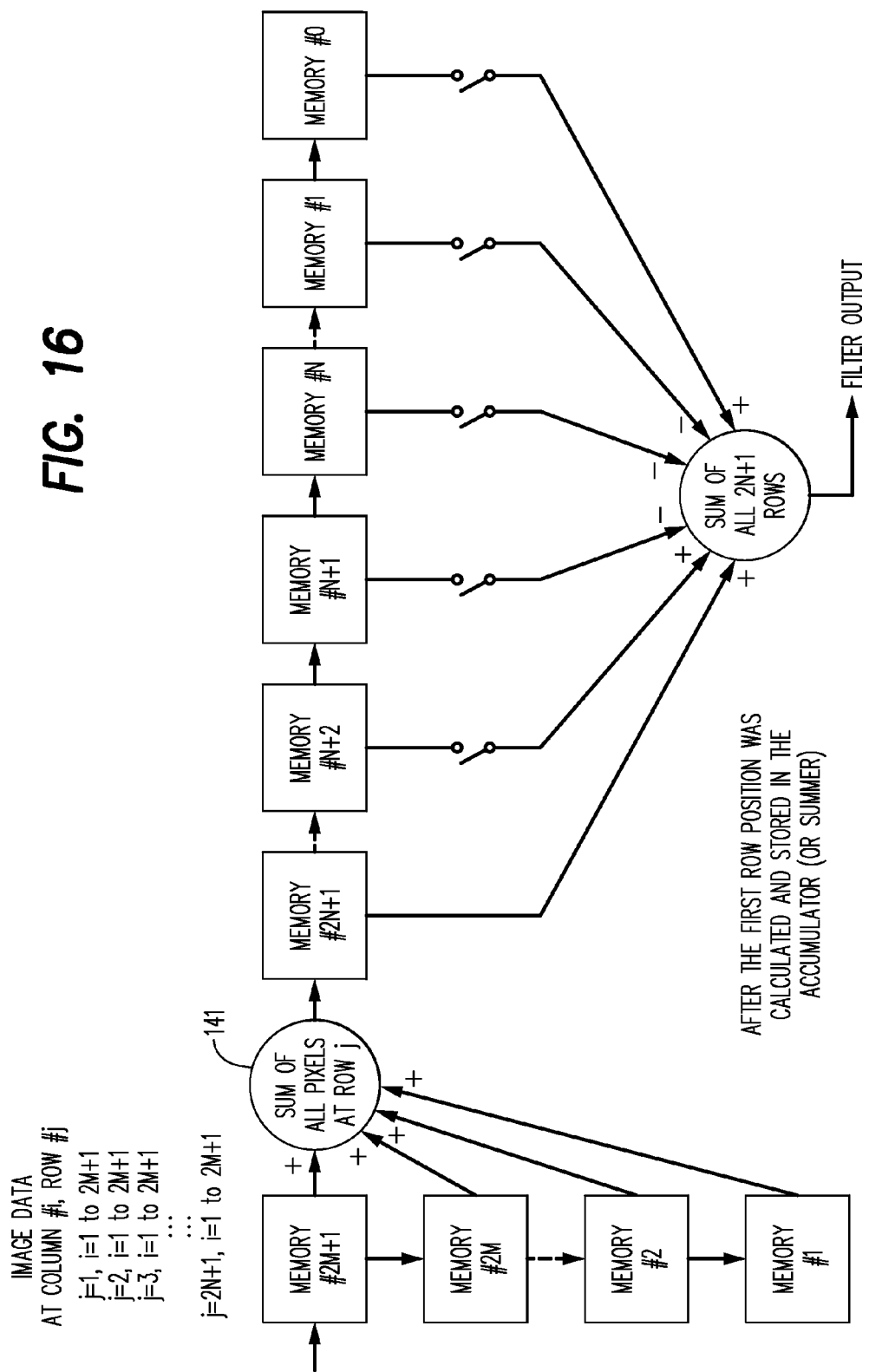
FIG. 16 is a diagram of an exemplary embodiment of an efficient horizontal edge detection filter of the present invention.

Only $R_{X,2N+1}$ at the new position is actually calculated and stored in memory #2N+1 while all other terms in the right side may be in the memories. The $R_X$ value, from the previous position and recently stored in the memory, may be used and updated by the summing operation and stored in the memory again. FIG. 16 illustrates yet another exemplary electronic circuits diagram of an exemplary method of the present invention. The electronic circuits may comprise memory locations, accumulators, summers, multipliers, adders, digital signal processors, memory storage devices, combinations comprising at least one of the foregoing, and the like, to efficiently calculate this horizontal edge detection filter. Image pixel data may be read out from image memory and fed to memory #2M+1 and shifted to memory #2M, ... #1. All pixels data in the same row may be summed at the summer, and the summer's output fed to memory #2N+1 and shifted to #N+2, ... and #0. For the first filter position, the contents of memory #2N+1 to #N+2 may be added while the contents of memory #N to #1 may be subtracted at the summer in order to calculate the filter output. Switches at memories function to achieve this operation. All switches except memory #N+1 and #0 are closed for the first filter position. Once the filter output is calculated, the new pixel data in the next row may enter memory #2M+1 to #1, summed at the summer, and this output or the newest summed row data from the next filter position may enter memory #2N+1. In the meantime, the contents of memory #2N+1 to 0 may all be shifted right by one memory. The filter result output, or the content of the summer from the previous filter position, may then be updated for the new position by adding the content of memory #2N+1 and #0 and subtracting the contents of memory #N+1 and #N. Again, as described beforehand, switches function to achieve this operation. Switches at memory #2N+1, #N+1, #N and #0 are closed while all other switches are open.

This iteration method saves the number of additions. These operations of vertical and horizontal edges may be expanded to have coefficients of a, −a, 0, or aj as before. With these coefficients, the iteration method saves the number of multiplications as well as additions, thus increasing the filter's speed.

The most general form of the edge detection filter is as follows, $$R = \sum_{\substack{i=1 \\ j=1}}^{\substack{i=2M+1 \\ j=2N+1}} a_{i,j} z_{ij} \tag{82}$$

However, the filter can be of symmetrical form as follows For the horizontal edge detection filter, $$a_{i,2N+2-j} = -a_{i,j} \tag{83}$$

and $$a_{i,N+1} = 0 \tag{84}$$

where i=1 to 2M+1 and j=1 to N
and $$a_{2M+2-i,j} = a_{i,j} \tag{85}$$

where i=1 to M and j=1 to 2N+1. This horizontal edge detection filter is illustrated in FIG. 7a as an exemplary embodiment of a 9×9 filter 71 of the present invention.

Furthermore, $a_{i,j}$ is split into x and y components for the horizontal edge detection filter as follows $$a_{i,j} = b_i \cdot c_j \tag{86}$$

$$b_{2M+2-i} = b_i \tag{87}$$

where i=1 to M

Also $$-c_{2N+2-j} = c_j \tag{88}$$

where j=1 to N

Finally the horizontal edge detection filter may be expressed as follows, $$R_X = -\sum_{\substack{i=1 \\ j=21}}^{\substack{i=2M+1 \\ j=N}} b_i c_j z_{ij} + \sum_{\substack{i=1 \\ j=N+2}}^{\substack{i=2M+1 \\ j=2N+1}} b_i c_{2N+2-j} z_{ij} \tag{89}$$

Again, as described earlier, this filter may use the iteration technique described beforehand to increase the calculation speed.

For the vertical edge detection filter, filter coefficients $a_{i,j}$ also have symmetry, with the exception of the sign (+/−).

$$a_{2M+2-i,j} = -a_{i,j} \tag{90}$$

and $$a_{M+1,j} = 0 \tag{91}$$

where i=1 to M and j=1 to 2N+1.

Also $$a_{i,2N+2-j} = a_{i,j} \tag{92}$$

where i=1 to 2M+1 and j=1 to N.

This vertical edge detection filter is illustrated in FIG. 7b as another exemplary embodiment of a 9×9 filter 73 of the present invention.

Furthermore, $a_{i,j}$ is split into x and y components for the vertical edge detection filter as follows $$a_{i,j} = b_i \cdot c_j \tag{93}$$

$$-b_{2M+2-i} = b_i \tag{94}$$

where i=1 to M $$c_{2N+2-j} = c_j \tag{95}$$

where j=1 to N

Finally the vertical direction filter may be expressed as follows, $$R_Y = \sum_{j=1}^{j=2N+1} c_j \left( -\sum_{i=1}^{i=M} b_i z_{ij} + \sum_{i=M+2}^{i=2M+1} b_{2M+2-i} z_{ij} \right) \tag{96}$$

Furthermore, this filter may use the iteration technique described earlier to increase the calculation speed.

In circumstances where the filter is a square mask and M=N, both edge detection filters, that is, the edge detection filters of 2 directions, need to be equally weighted in the directions and thus $$|b_i| = |c_i| \tag{97}$$

except for the center row for the horizontal edge detection filter and the center column for the vertical edge detection filter. Also the same symmetrical properties, which were previously discussed, apply to these coefficients as well. Therefore, the edge detection filters where M=N may be expressed as follows.

$$R_X = -\sum_{\substack{i=1\\j=1}}^{\substack{i=2M+1\\j=M}} b_i b_j z_{ij} + \sum_{\substack{i=1\\j=M+2}}^{\substack{i=2M+1\\j=2M+1}} b_i b_{2M+2-j} z_{ij} \quad (98)$$

Figure 17:
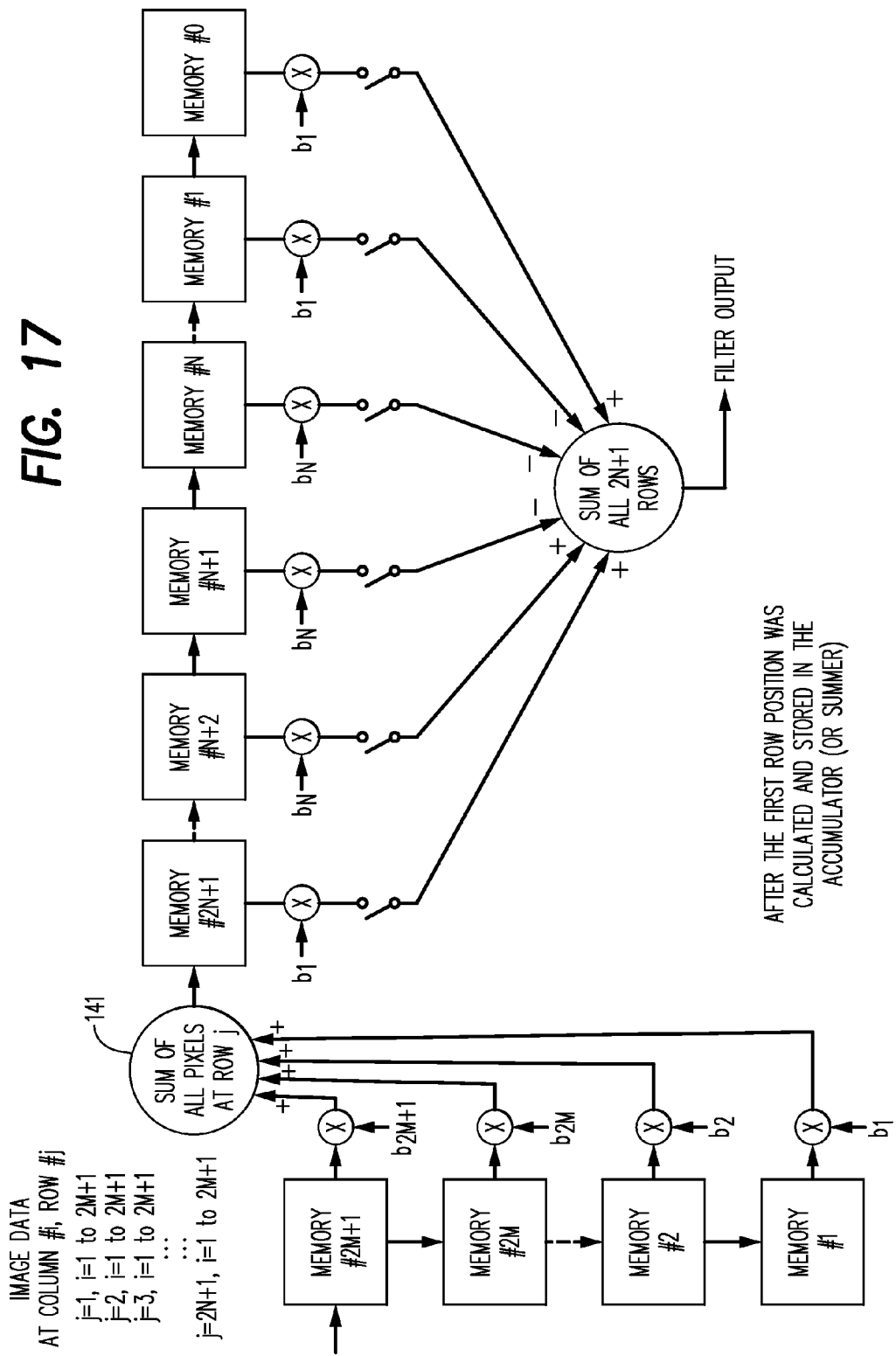
FIG. 17 is a diagram of an exemplary embodiment of the horizontal edge detection filter with filter coefficients of $b_i$ of the present invention.

This horizontal edge detection filter is illustrated in FIG. 8*a* which depict an exemplary embodiment of an 9×9 filter 81 of the present invention. This horizontal edge detection filter may be efficiently calculated using the exemplary method illustrated by the exemplary electronic circuit diagram shown in FIG. 17. Image data may be read out from image memory and fed to memory #2M+1 and shifted to memory #2M, . . . #1. The contents of these memories may be multiplied by coefficients b1, . . . , b2M+1 and summed at the summer. The output of summer may be fed to memory #2N+1 and shifted to memory #2N, . . . #0. For the first filter position, the contents of memory #2N+1 to #1 excluding #N+1 may be multiplied by coefficients and summed at the summer to calculate the filter output. For the next filter position, the new image data for the newest row may be read out from the image memory, fed to memory #2M+1, and shifted. The contents of memory #2M+1 to 1 may then be multiplied by coefficients and summed at the summer, and the summer's output may be fed to memory #2N+1. Meantime, the contents of memory #2N+1 to #0 may be shifted to the right by one memory. The filter output or the content of the summer may be updated by adding the value of memory #2N+1 multiplied by coefficient b1, subtracting the values of memory #N+1 and #N multiplied by bN, and adding the value of memory #0 multiplied coefficient b1 to the filter output of the previous position, or the summer's content.

$$R_Y = \sum_{j=1}^{j=2M+1} b_j \left( -\sum_{i=1}^{i=M} b_i z_{ij} + \sum_{i=M+2}^{i=2M+1} b_{2M+2-i} z_{ij} \right) \quad (99)$$

where M=N.

Figure 18:
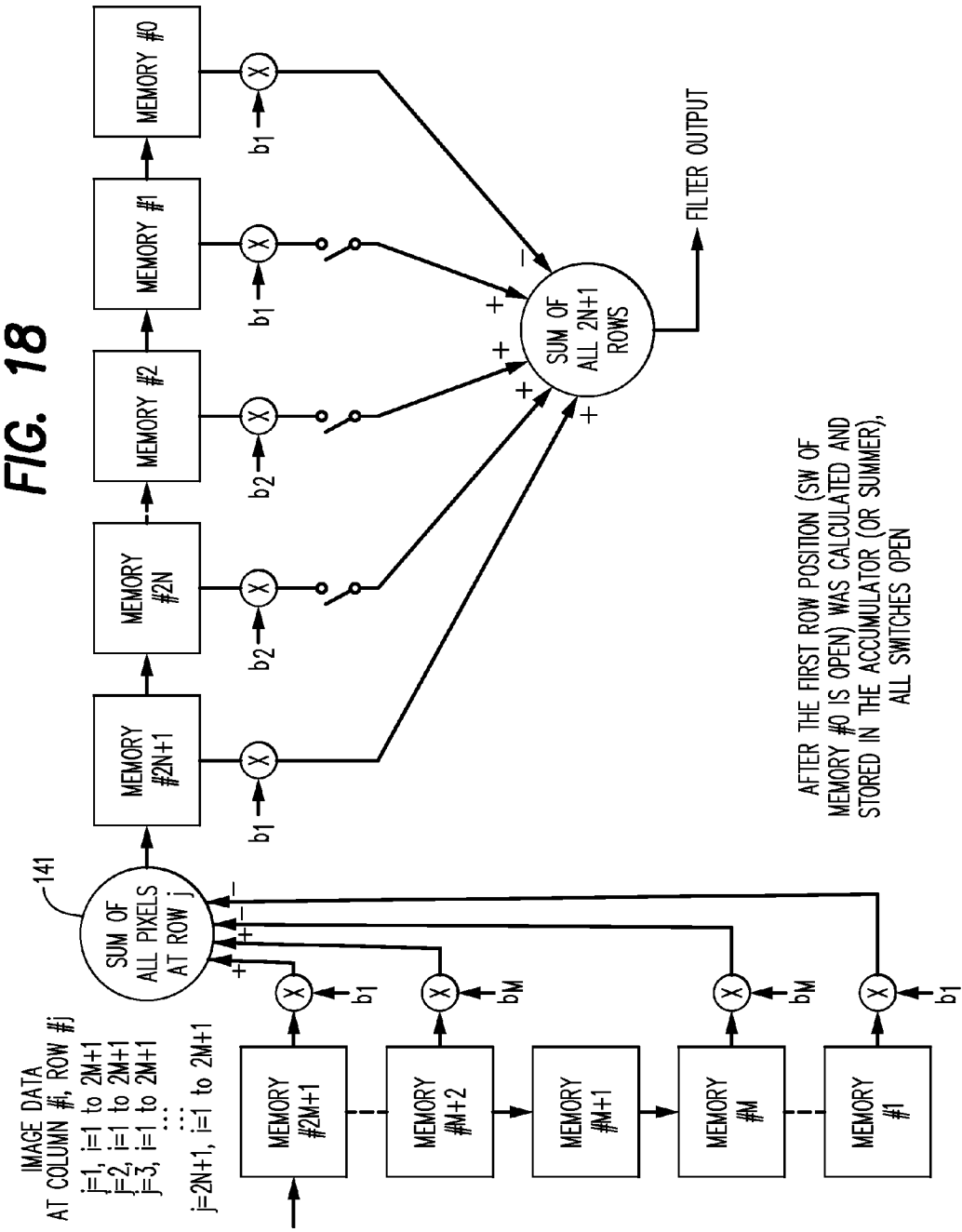
FIG. 18 is a diagram of an exemplary embodiment of the vertical edge detection filter with filter coefficients of $b_i$ of the present invention.

This vertical edge detection filter is illustrated in FIG. 8*b* which depicts an exemplary embodiment of a 9×9 filter 83 of the present invention. The exemplary method illustrated by the exemplary electronic circuit shown in FIG. 18 can efficiently calculate the vertical edge detection filter output. Image data may be read out from image memory, fed to memory #2M+1, and shifted to #2M to #1. These column pixel data in the same row may be multiplied by coefficients, and summed, that is, added or subtracted, at the summer as shown in FIG. 18. The summer's output may be fed to memory #2N+1 and shifted right by one memory as more summation data in a row are fed to memory #2N+1. For the first filter position, the contents of memory #2N+1 to 1 may be multiplied and summed at the summer to calculate the filter output. For the next position, the result of the first filter position may be used to efficiently calculate the next result. As the new summed data of the newest row for the new filter position is fed to memory #2N+1, all memory contents may be shifted right and the new filter output is calculated by adding memory #2N+1 content multiplied by coefficient b1, and subtracting memory #0 multiplied by b1 from the previous filter result or the content of the summer.

In yet another exemplary embodiment, the filters may move upward starting from the bottom row. In another embodiment, the filter may move laterally, for example, to the right, starting from the far left column. In yet another exemplary embodiment, the filters may move laterally to the left, starting from the far right column.

In yet another embodiment of the present invention, edges may be detected by edge detection filters and enhanced by an edge enhancement filter. Such edge enhancement filters include, but are not limited to, two-dimensional high-pass filters, low-pass filter, band-pass filters, and the like.

The strength and type of these edge enhancement filters being employed are determined by the edge detection filter(s) outputs, i.e., the magnitude and direction. In a preferred embodiment, the edge enhancement filter may be a spatial two-dimensional filter expressed by the following equation, $$z_{ip} = \sum_{\substack{i=1\\j=1}}^{\substack{i=2M+1\\j=2N+1}} w_{ij} z_{ij} \quad (100)$$

where $z_{ip}$ represents the image intensity of the processed data; $w_{ij}$ represents the filter coefficients at coordinates (i,j); and, $z_{ij}$ represents the image data at coordinates (i,j) before processing.

In a preferred embodiment, the filter coefficients of the edge enhancement filter are directional just like the edge detection filter. The direction of the detected edge is usually defined by the direction of the highest spatial derivative in the field of image processing. In the present invention, however, the direction of a detected edge is defined as a direction perpendicular to the direction of the highest spatial derivative of the image intensity of the target pixel. Therefore, the edge enhancement filter is directional and has smoothing effects, or low-pass filtering, in a direction $\vartheta$ of the detected edge, as defined above, or perpendicular to the direction of the highest spatial derivative at the target pixel. Furthermore, the detected edge may be enhanced by applying high-pass filtering which has sharpening effects in the direction of the highest spatial derivative. Alternatively, a low-pass filter of lesser degree than the one in the direction $\vartheta$ may be applied in the direction of the highest spatial derivative. The direction of $\vartheta$ and the direction of the highest spatial derivative may be approximated within a few degrees, such as ten (10) degrees higher or lower. This approximation may also be as much as 30 or 40 degrees higher or lower in the direction of $\vartheta$ and the direction of the highest spatial derivative. In yet another alternative embodiment, band-pass filtering may be applied to enhance the edge in the direction of the highest spatial derivative. In yet another alternative embodiment no filtering (i.e. all-pass filtering) may be applied in the direction of the highest spatial derivative. The strength of the edge enhancement in the direction of the highest spatial derivative may be proportional to the magnitude of the detected edge, i.e., the strength is high if the edge's magnitude is high; or the strength is low if the edge's magnitude is low.

For example, if the horizontal edge detection filter 193 shown in FIG. 19*b* detects a strong horizontal edge in an image, a low-pass filter 201 shown in FIG. 20*a* will be applied to enhance the strong horizontal edge. The output of the horizontal edge detection filter 193 is normalized by a filter normalization factor of five (5) which corresponds to the total number of filter coefficients equal to one in the horizontal edge detection filter 193. If a weaker horizontal edge with a smaller magnitude but having the same direction is detected, a weaker low-pass horizontal filter 203 as illustrated in FIG. 20*b* will be used. The output of the weaker low-pass horizontal filter 203 is normalized by a filter normalization factor of three (3). If the vertical edge detection filter 191 in FIG. 19*a* instead of the horizontal edge detection filter detects a strong vertical edge in the image, the vertical edge enhancement filter 211 in FIG. 21*a* will be applied to enhance the edge. If a weaker vertical edge with a smaller magnitude but the same direction is detected, a weaker low-pass vertical filter 213 as illustrated in FIG. 21*b* will be used. For the diagonal direction of +45 degrees, an edge detection filter shown in FIG. 19*c* may be used to detect an edge which may be enhanced by one or more of the exemplary edge enhancement filters shown in FIGS. 22*a* and 22*b*. For the diagonal direction of −45 degrees, an edge detection filter shown in FIG. 19*d* may be used to detect an edge which may be enhanced by one or more of the exemplary edge enhancement filters shown in FIG. 23*a* or 23*b*.

In a preferred embodiment, the direction $\vartheta$ of the edge may be determined by equation 103 (shown below) and calculated using the ratio of the vertical to horizontal edge detection filter outputs ($R_X/R_Y$). This method of calculation utilizing only two (2) edge detection filters, i.e., the vertical and horizontal filters, is preferred as performing calculations using data from two edge detection filters is much faster than calculating, for example, twenty (20) edge detection filters for twenty (20) directions as previously described. These two edge detection filters of the present invention are expressed in equation 101 and 102 as follows, $$R_X = -\sum_{\substack{i=1 \\ j=1}}^{\substack{i=2M+1 \\ j=N}} z_{i,j} + \sum_{\substack{i=1 \\ j=N+2}}^{\substack{i=2M+1 \\ j=2N+1}} z_{i,j} \quad (101)$$

$$R_Y = \sum_{j=1}^{j=2N+1}\left(-\sum_{i=1}^{i=M} z_{i,j} + \sum_{i=M+2}^{i=2M+1} z_{i,j}\right) \quad (102)$$

The direction ($\vartheta$) and magnitude of an edge are determined by equation 103 and 104 shown below.

$$\vartheta = \tan^{-1}\frac{R_Y}{R_X} \quad (103)$$

$$\text{magnitude} = (R_X^2 + R_y^2)^{0.5} \approx |R_X| + |R_Y| \quad (104)$$

Since $R_X$ and $R_Y$ values depend on each filters respective size and coefficients, $R_X$ and $R_Y$ may be normalized or divided by the sum of the absolute values of all the filter coefficients to yield the normalized values $NR_X$ and $NR_Y$ in equations 105, 106. In this case, the sum becomes the number of non-zero coefficients since all non-zero coefficients are either 1 or −1. The normalized magnitude of the edge is thus obtained by equation 107.

$$NR_X = \frac{1}{(2M+1)(2N)}\left(-\sum_{\substack{i=1 \\ j=1}}^{\substack{i=2M+1 \\ j=N}} z_{i,j} + \sum_{\substack{i=1 \\ j=N+2}}^{\substack{i=2M+1 \\ j=2N+1}} z_{i,j}\right) \quad (105)$$

$$NR_Y = \frac{1}{(2M)(2N+1)}\sum_{j=1}^{j=2N+1}\left(-\sum_{i=1}^{i=M} z_{i,j} + \sum_{i=M+2}^{i=2M+1} z_{i,j}\right) \quad (106)$$

$$\text{normalized\_magnitude} = (NR_X^2 + NR_y^2)^{0.5} \approx |NR_X| + |NR_Y| \quad (107)$$

However, for a given size and given filter coefficients of the edge detection filters, this normalization, or division, step is not necessary and can be eliminated to speed up the processing. Examples of the vertical and horizontal edge detection filters are illustrated in FIGS. 19*a* and 19*b*. For purposes of illustration, the size of the filters may be 5×5, where M=N=2. As one of ordinary skill in the art will recognize, the filter size can be, for example, smaller or larger than this size and can be for example, 3×3, 7×7, 9×9 or larger.

An edge's direction, as defined in equation 103, varies from −90 to 90 degrees, or a range of 180 degrees, in an analog or continuous fashion. However, the number of edge enhancement filter directions may be limited to about 18 to cover all 180 degrees at increments of about 10 degrees. For example, the first direction may range from −90 degrees to −80 degrees. The second direction may encompass from −80 degrees to −70 degrees. And, the 18th direction may encompass from 80 degrees to 90 degrees. Other selections of angles or directions may be made. Although only two (2) are shown for the purposes of illustration in FIGS. 20*a* and 20*b*, the number of filters in one direction can be one or more, and typically several, to provide various degrees of filter strength. In another embodiment, the number of the filter's directions can be reduced to about nine (9) or less with an angle increment of about 20 degrees or greater. The finite number of directions and degrees, that is, strength as in stronger or weaker, of the vertical and horizontal edge enhancement filters make it possible to store in a memory storage device or a look-up table (LUT) all of the image filters and their filter coefficients necessary to perform image processing including, but not limited to, edge enhancement and noise reduction.

In a preferred embodiment, if the magnitude of the edge described in equation 104 is lower than some threshold, the speckle noise reduction filter or a non-directional smoothing filter is applied rather than the directional edge enhancement filter described previously. The method of the present invention also determines if the non-directional smoothing filter should be applied based upon the output, i.e., the magnitude of the vertical and horizontal edge detection filters of the present invention described previously.

Figure 25A:
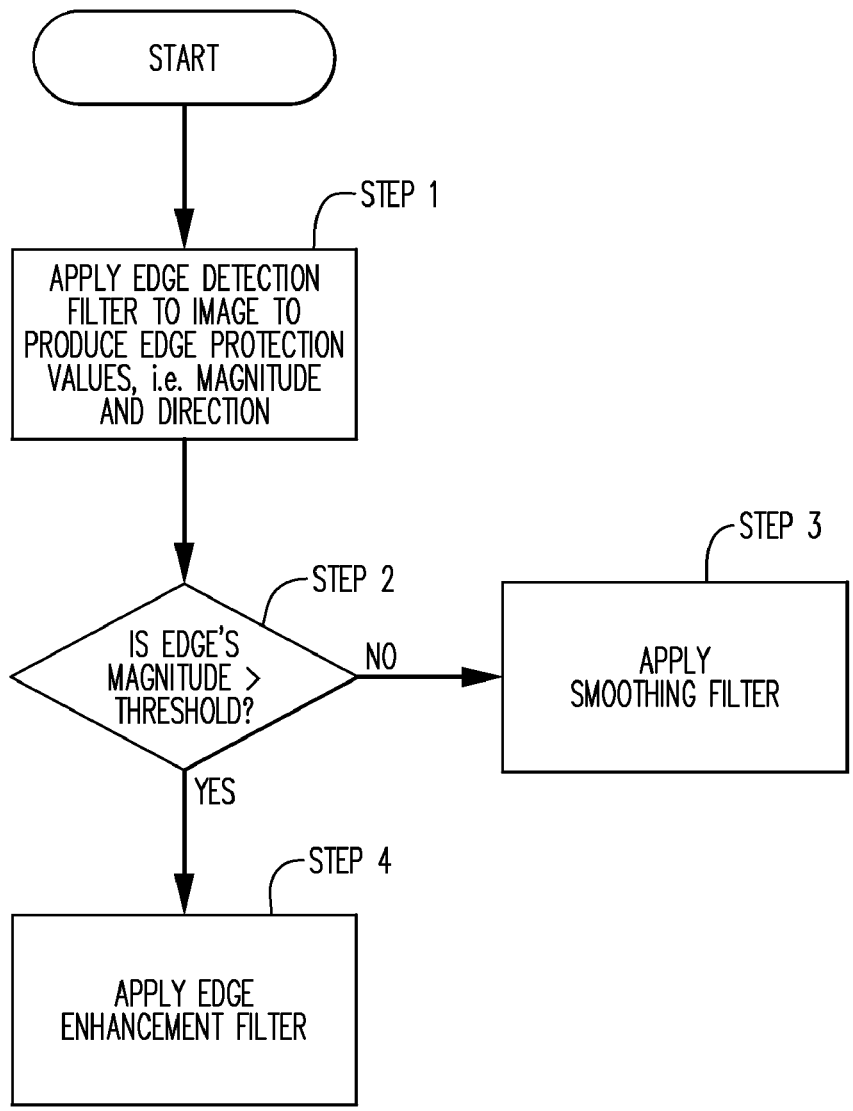
FIG. 25a depicts a logic diagram of an exemplary method of the present invention.

With reference to FIG. 25*a*, there is illustrated a flow chart of the logic of the method of the present invention. As will be described more fully below, with reference to step 1, an edge detection filter is applied to an image to produce an edge detection value, or the magnitude in equation 104, for a given target pixel. Next, with reference to step 2, the edge detection value is checked to see if it is greater than a threshold value. The threshold value may assume any value and is chosen such that an edge detection value greater than the threshold value is indicative of the presence of an edge at the site of the target pixel. Conversely, a threshold value less than or equal to the edge detection value, is indicative of a target pixel which does not form part of an edge, but rather is part of a homogeneous area. If the edge detection value is not greater than the threshold value, indicating a target pixel which forms part of a homogeneous area, smoothing is applied by a smoothing filter to the target pixel in step 3. Conversely, if the edge detection value is greater than the threshold value, indicating that the target pixel is part of an edge, edge enhancement may be applied by an edge enhancement filter in step 4. After applying the method illustrated in FIG. 25*a* to determine whether the edge magnitude is greater than the threshold value and whether the target pixel belongs to an edge, a method of selecting an edge enhancement filter is illustrated in FIG. 25*b*.

Figure 25B:
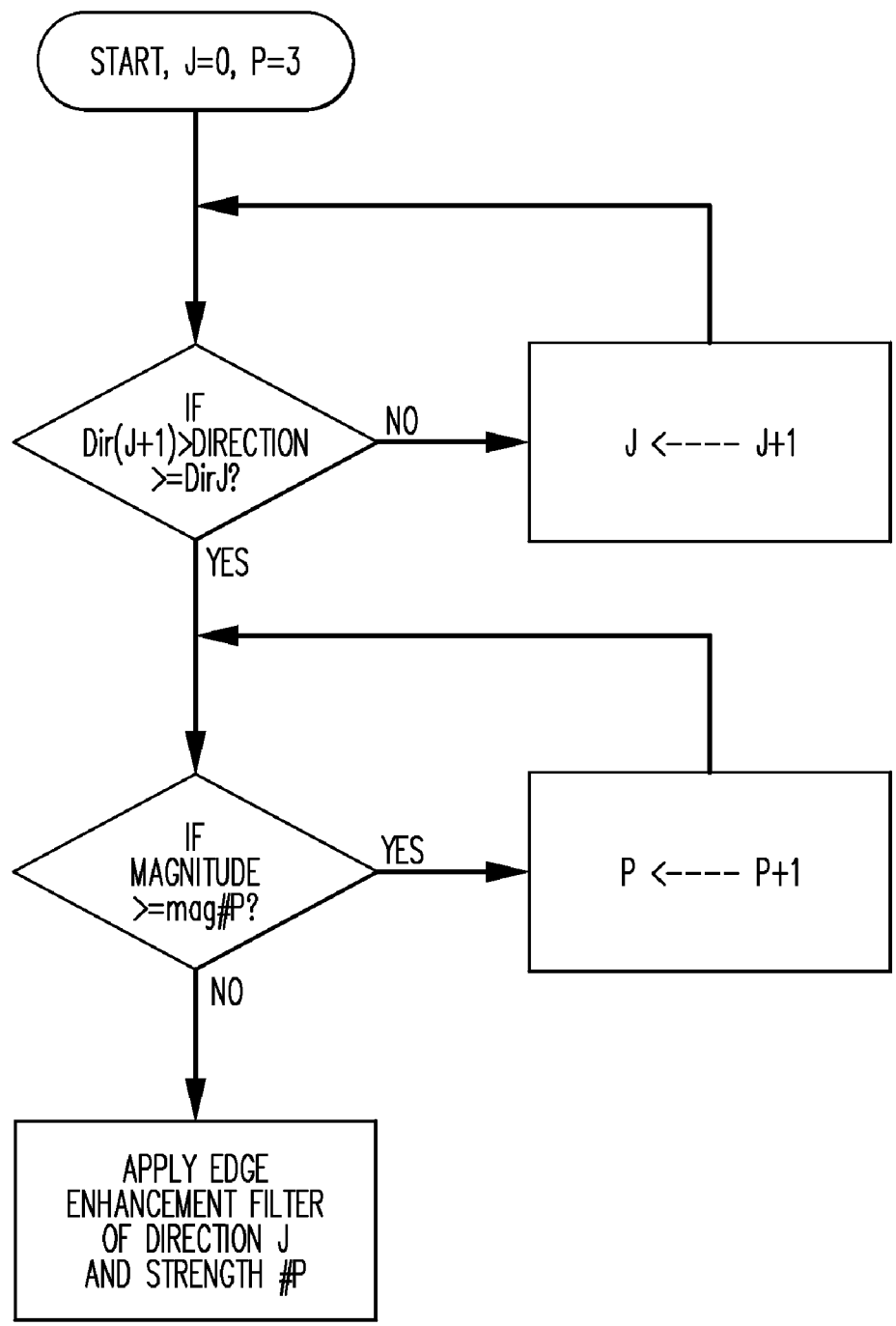
FIG. 25b depicts a logic diagram of an exemplary method of edge enhancement of the present invention.
Figure 25C:
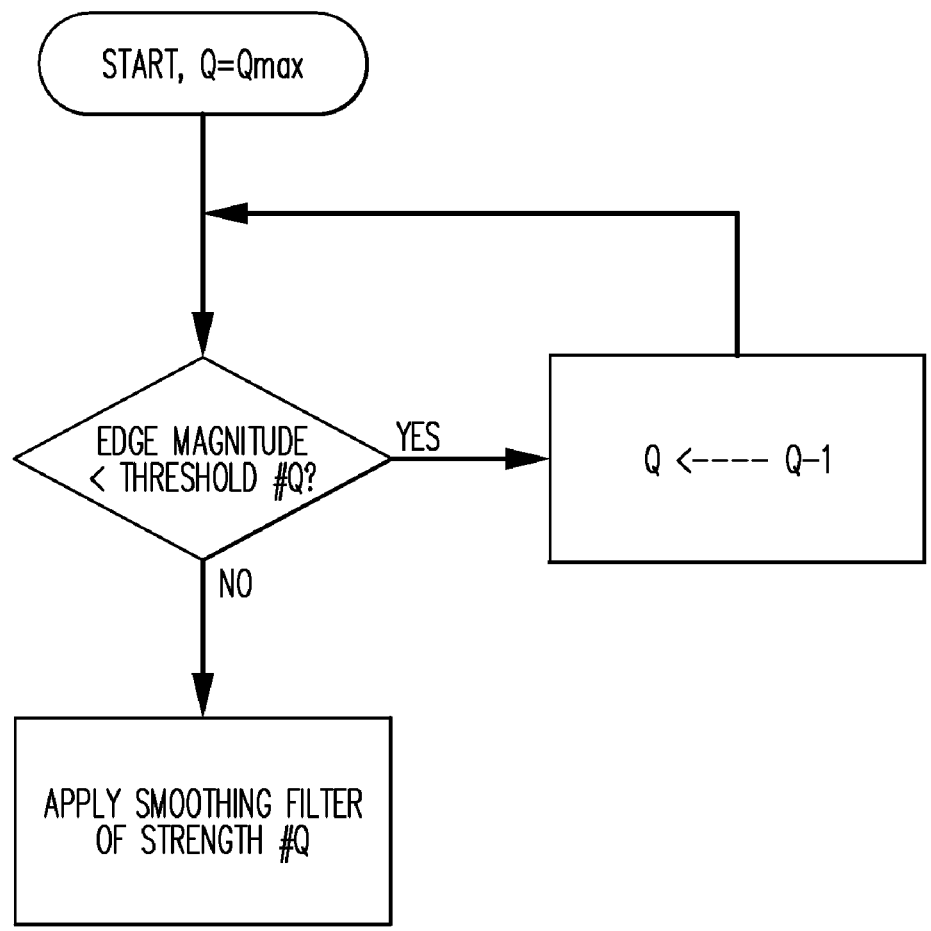
FIG. 25c depicts a logic diagram of an exemplary method of noise reduction of the present invention.

Referring now to FIG. 25*b*, the edge direction is first evaluated to determine whether the value of the direction is greater than or equal to a lower direction threshold value, Direction J ("DirJ"), but less than an upper direction threshold value, Direction J+1 ("Dir(J+1)"). If value of the direction is greater or equal to the lower direction threshold value and less than the upper directional threshold value, then Direction J will be selected. Next, the edge's magnitude is evaluated again and an edge enhancement filter of appropriate strength will be selected. Referring now to FIG. 25c, FIG. 25c illustrates a flow chart for the selection of a non-directional smoothing filter of the present invention. This selection is performed once the method of FIG. 25a determines that an image target pixel is not an edge and thus requires non-directional smoothing. The strength of the required non-directional smoothing is determined by evaluating the edge magnitude as shown in the flowchart of FIG. 25c.

The edge detection filters 191, 193 determine whether an image target pixel belongs to an edge or constitutes a homogeneous tissue area. The magnitude of the edge detection filter output as expressed in equation 104 is used to determine whether the target pixel belongs to an edge or a 'strong' or 'steep' edge. If the target pixel belongs to a homogeneous tissue area, a two-dimensional, non-directional smoothing filter 241, 243, as shown in FIGS. 24a and 24b, may be applied to the target pixel. If the edge detection filter does not detect a magnitude constituting a significant edge, a non-directional smoothing filter 241, 243 will be used to reduce speckles. The smoothing filter may comprise a two-dimensional filter, e.g., low-pass, median, smoothing, and the like. Furthermore, the strength or degree of the smoothing filter is determined by the output, i.e., the magnitude in equation 104, of the vertical and horizontal edge detection filters previously described. The degree or strength of the smoothing filter increases as the magnitude in Equation 104 decreases. In other words, a greater degree of smoothing will be applied if the detected magnitude is small. The two-dimensional smoothing filter is non-directional. In FIG. 24a, the filter output is normalized by a factor of twenty-five (25). If stronger smoothing is required, a stronger filter in FIG. 24a can be used instead of the filter in FIG. 24b which is weaker.

Figure 26:
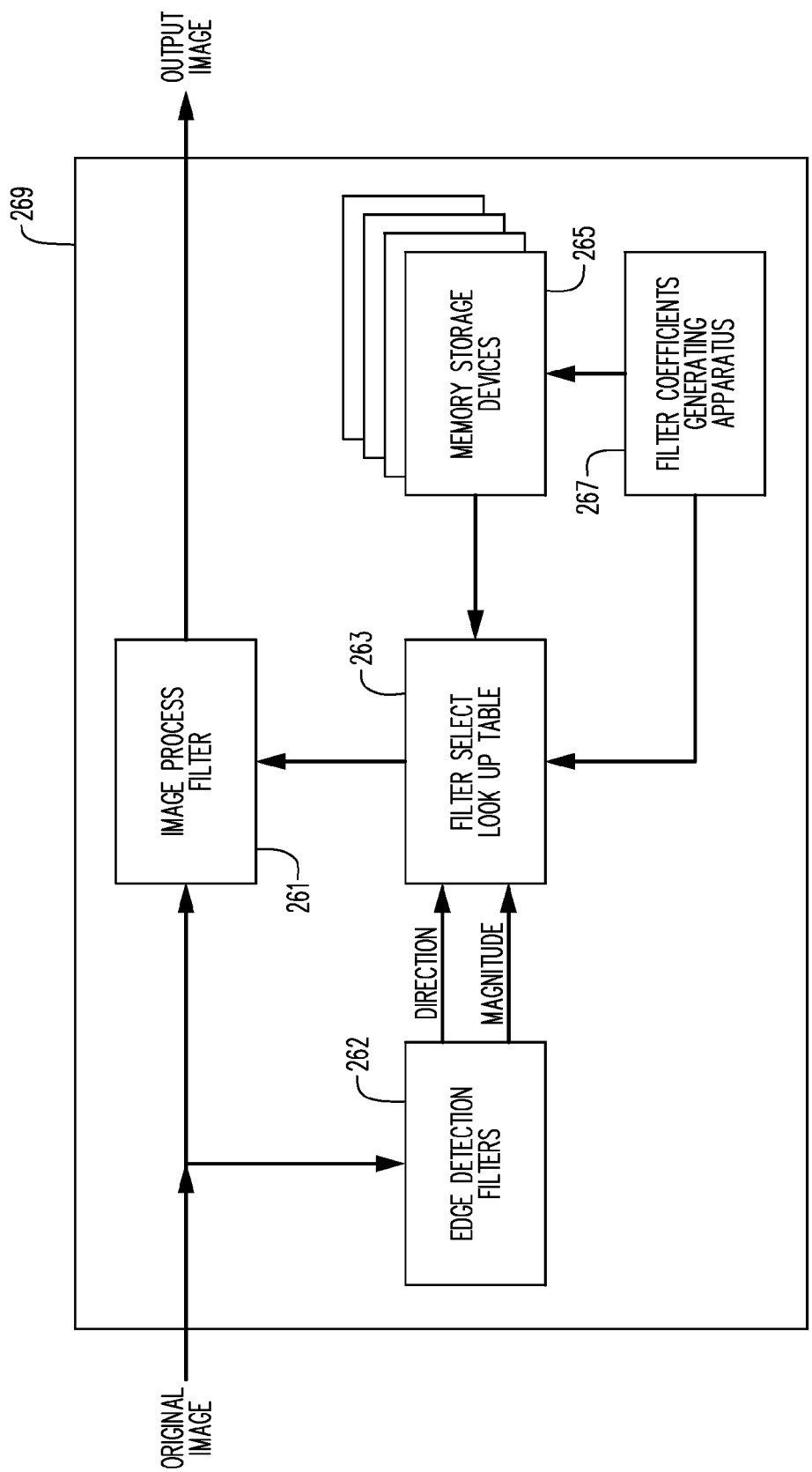
FIG. 26 depicts a diagram of an exemplary embodiment of an image processor of the present invention.

Referring now to FIG. 26, FIG. 26 illustrates a diagram of an image filtering system of the present invention to implement the image processing methods previously described. Once the direction and magnitude of an edge is calculated by the edge detection filter and fed to the filter select look-up table, the selection of a two-dimensional image filter, or the filter coefficient values corresponding to a two-dimensional image filter, may be performed by the Filter Select Look-up-Table 263. Generally, a set of image filters may comprise any number of image filters, for example, about thirty image filters. The set of image filters correspond to a single clinical application such as a liver image, a breast image, any other organ image, and the like. Each image filter may comprise a plurality of filter coefficients, for example, about one hundred filter coefficients. For example, referring to the Look-up-Table of FIG. 27, each cell represents one image filter containing its respective image filter coefficients.

A plurality of filter coefficients are downloaded from LUT 263 to an image process filter 261 and applied to the original image to yield an output image on a pixel-by-pixel basis. In the meantime, image process filter 261 updates or changes its image filter coefficients on a pixel-by-pixel basis based on the edge detection filter's outputs, the magnitude and the direction. Image process filter 261 may comprise a non-directional smoothing filter or a directional edge enhancement filter based upon the direction and magnitude of the edge at the target pixel on a pixel-by-pixel basis as previously described. Image process filter 261 and Image Processor 269 may be implemented by one or more apparatus such as digital signal processors, multipliers, adders, memory storage devices and the like, and preferably digital signal processors. When an ultrasound system changes its application mode from one clinical application to another, e.g. breast imaging to liver imaging, or heart imaging, a new set of filters and their filter coefficients in the Look-up-table need to be downloaded or inputted from another device such as a memory storage device 265.

Filter Select Look-up-Table 263 may comprise a plurality of image filters, or filter coefficient values corresponding to the plurality of image filters, which may be temporarily stored and utilized pursuant to each clinical application, that is, a liver image, a breast image, any other organ, and the like. Preferably, Filter Select Look-up-Table 263 contains only a set of image filters for one clinical application at a time, and a limited number of image filters and their filter coefficients at a time due to a limited size of the memory allotted to the Look-up-Table. In the alternative, Look-up-Table 263 contains a set of image filters for a clinical application currently in use, and stores one or more additional set(s) of image filters for other clinical applications pursuant to the storage capacity of Look-up-Table 263. Filter Select Look-up-Table 263 receives a set of image filters for one clinical application at a time from a memory storage device 265 and/or an apparatus 267 capable of generating a plurality of image filters and a plurality of sets of image filter coefficients. Such an apparatus 267 may comprise a device with a central processing unit (CPU), digital signal processors, and the like, and preferably digital signal processors.

One or more memory storage devices 265 store a plurality of sets of image filters for a plurality of clinical applications, and forwards one set, for example, about thirty (30), of image filters and their filter coefficients for one clinical application upon request to the Filter Select Look-up-Table 263. Memory storage devices 265 in communication with Look-up-Table 263 may download or input one or more sets of image filters into Look-up-Table 263. One or more apparatus 267 capable of generating image filter or image filter coefficients may be in communication with Look-up-Table 263 and memory storage device 265, or with Look-up-Table 263 alone. For example, apparatus 267 may download or input one or more sets of image filters into memory storage device 265 for temporary storage prior to transfer to Look-up-Table 263, or to Look-up-Table 263 directly. Any manual or electronic operation that facilitates the transferring, inputting and/or downloading of such data from apparatus 267 to memory storage device 265 or Table 263, or from memory storage device 265 to Table 263 such as electronic circuitry, via wire, cable, wireless, and the like, may be utilized as well as other such operations known to one of ordinary skill in the art.

Referring now to FIG. 27, FIG. 27 illustrates an exemplary embodiment of LUT 263. One image filter represents and contains its set of filter coefficients stored in the LUT. This LUT is only for illustration purpose and can be larger or smaller. In other words, the number of directions and magnitude levels can be smaller or larger than this example of nine (9) directions and five (5) magnitude levels. In this example, the directions are equally spaced at an interval of 20 degrees but an unequal interval can be also used.

In this exemplary embodiment of the LUT, the nine (9) filter directions (−80, −60, −40, −20, 0, 20, 40, 60, 80 degrees) are depicted in the horizontal axis while the five (5) levels of edge magnitude are shown in the vertical axis. Each cell in the LUT represents an image filter and their filter coefficients for either smoothing, e.g., SM2, or edge enhancement, e.g., E6M4. For example, the filter direction of −60 degrees encompasses −70 to −50 degrees of the edge direction 9 obtained by the edge detection filter. In other words, one direction value represents a designated direction value range of plus/minus (+/−) 10 degrees, or a range of 20 degrees. If the magnitude of the edge is lower than magnitude1 ("Mag1"), a non-directional smoothing filter SM1 will be selected regardless of the edge direction value. If the magnitude of the edge is lower than magnitude2 ("Mag2") but greater than or equal to Mag1, a non-directional smoothing filter SM2 will be selected regardless of the edge direction value. However, if the edge's magnitude is greater than or equal to a value of Mag2, an edge enhancement filter will be selected. For example, if $\vartheta$ is 25 degrees and the edge's magnitude is higher than or equal to Mag3 but lower than Mag4, the edge enhancement filter E2M4 will be selected.

One or more embodiments of the present invention have been described. Nevertheless, it will be understood that various modifications may be made without departing from the spirit and scope of the invention. Accordingly, other embodiments are within the scope of the following claims.

What is claimed is:

1. A method comprising the steps of:
  applying an edge detection filter to at least one of a plurality of pixels of an ultrasound image to compute an edge detection value comprising a magnitude;
  applying a directional edge enhancement filter and not a non-directional smoothing filter to said at least one of said plurality of pixels of said ultrasound image if the magnitude is greater than a threshold value; and
  if the magnitude is less than the threshold value, selecting a non-directional smoothing filter from a plurality of non-directional smoothing filters based on the magnitude, and applying the selected non-directional smoothing filter and not a directional edge enhancement filter to said at least one of said plurality of pixels of said ultrasound image.

2. The method of claim 1, wherein said ultrasound image is selected from the group consisting of B-mode tissue images, Doppler spectrum images, blood flow images, elasticity images, grayscale images, intensity images and combinations comprising at least one of the foregoing images.

3. The method of claim 1, wherein said applying said directional edge enhancement filter comprises applying a directional edge enhancement filter selected from the group consisting of high-pass filters, low-pass filters and band pass filters.

4. The method of claim 1, wherein said applying said edge detection filter comprises applying a vertical edge detection filter whose output is $R_Y$.

5. The method of claim 1, wherein said applying said directional edge detection filter comprises applying a horizontal edge detection filter whose output is $R_X$.

6. The method of claim 1, comprising the additional step of calculating a direction of an edge comprising:
  calculating an output $R_X$ from a horizontal edge detection filter;
  calculating an output $R_Y$ from a vertical edge detection filter; and
  calculating said direction $\vartheta$ of said edge using an equation $$\vartheta = \tan^{-1} \frac{R_Y}{R_X}.$$

7. The method of claim 1, wherein the computed edge detection value comprises a direction perpendicular to a direction of a highest spatial derivative of an image intensity at a target image pixel of said plurality of pixels of said ultrasound image.

8. The method of claim 1, wherein the computed edge detection value comprises a primary direction, wherein said primary direction is associated with an approximate direction comprising a range of −90 degrees to 90 degrees, wherein said range further comprises a plurality of directions and said primary direction is assigned a direction falling within said range.

9. The method of claim 8, wherein said range is measured in a plurality of increments, wherein said plurality of increments represent a finite number of directions.

10. The method of claim 1, comprising the additional step of calculating said magnitude of an edge using an equation $|R_X|+|R_Y|$.

11. The method of claim 1, comprising the additional step of calculating said magnitude of an edge using an equation $(R_X^2+R_Y^2)^{0.5}$.

12. The method of claim 1, wherein said applying said directional edge enhancement filter comprises
  enhancing said edge using said directional edge enhancement filter.

13. The method of claim 1, comprising the additional step of enhancing a detected edge of said at least one of said plurality of pixels by smoothing said detected edge in a direction perpendicular to a direction of a highest spatial derivative of an image intensity of a target pixel;
  applying a filter selected from the group consisting of an all-pass filter, a high-pass filter, a band-pass filter, a smoothing filter, a low-pass filter and combinations comprising at least one of the foregoing filters in said direction of said highest spatial derivative of an image intensity of target.

14. The method of claim 13, comprising the additional step of selecting a directional edge enhancement filter prior to said enhancement step comprising the steps of:
  calculating a direction and said magnitude of said detected edge by said edge detection filter;
  feeding said direction and said magnitude of said detected edge to a filter select look-up table; and
  selecting said directional edge enhancement filter based upon said direction and said magnitude of said detected edge.

15. The method of claim 14, wherein said selection of said directional edge enhancement filter comprises selecting a strong edge enhancement filter when said magnitude of said edge is high.

16. The method of claim 14, wherein said selection of said directional edge enhancement filter comprises selecting a weak edge enhancement filter when said magnitude of said edge is low.

17. The method of claim 1, comprising the additional step of enhancing a detected edge of said at least one of said plurality of pixels by smoothing said detected edge in an approximated direction falling within an approximated upper direction boundary and an approximated lower direction boundary of a range of directions, wherein said range includes a primary direction of said detected edge.

18. The method of claim 17, said enhancement step comprises applying additionally a filter selected from the group consisting of an all-pass filter, a high-pass filter, a band-pass filter, a low-pass filter, a smoothing filter and combinations comprising at least one of the foregoing filters in a direction approximately perpendicular to said approximated direction.

19. The method of claim 1, wherein the computed edge detection value comprises a direction, and wherein applying a directional edge enhancement filter and not a non-directional smoothing filter comprises:

selecting a range of directions comprising a lower direction boundary Dir(J) and an upper direction boundary Dir(J1), wherein said range includes said direction of said edge detection value;
selecting a range of magnitudes comprising a lower magnitude boundary (#P) and an upper magnitude boundary (#P+1), wherein said range includes said magnitude of said edge detection value; and
selecting said directional edge enhancement filter based upon said selected range of directions approximate to said direction of said edge detection value and based upon said selected range of magnitudes approximate to said detected magnitude of said edge detection value.

20. The method of claim 1, comprising the additional step of enhancing a detected homogeneous area of said at least one of said plurality of pixels by smoothing said detected homogeneous area using said non-directional, smoothing filter, wherein said non-directional, smoothing filter is selected from a group consisting of a non-directional low-pass filter, a non-directional band-pass filter, a median filter, and combinations comprising at least one of the foregoing filters.

21. The method of claim 20, comprising selecting a non-directional smoothing filter prior to said enhancement step, wherein selecting the non-directional smoothing filter comprises:
calculating said magnitude of a detected homogenous area by said edge detection filter; and
selecting said non-directional smoothing filter from a filter select look-up table based upon said magnitude of said homogeneous area.

22. The method of claim 21, wherein said selection of said non-directional, smoothing filter comprises selecting a strong non-directional, smoothing filter when said magnitude of said homogeneous area is low.

23. The method of claim 21, wherein said selection of said non-directional, smoothing filter comprises selecting a weak non-directional, smoothing filter when said magnitude of said homogeneous area is high.

24. The method of claim 20, comprising the additional step of selecting said non-directional, smoothing filter prior to said enhancement step comprising the steps of:
selecting a range of magnitudes comprising a lower threshold value boundary (#Q−1) and an upper threshold value boundary (#Q), wherein said range includes said magnitude of said edge detection value; and
selecting a non-directional smoothing filter based upon said selected range of magnitudes approximate to said magnitude of said edge detection value.

25. A method comprising the steps of:
applying a two-dimensional edge detection filter to at least one of a plurality of pixels of an ultrasound image to compute an edge detection value comprising a magnitude;
if the magnitude is greater than a threshold value, identifying an edge of said at least one of said plurality of pixels of said ultrasound image and applying a directional edge enhancement filter and not a non-directional smoothing filter to the edge; and
if the magnitude is less than the threshold value, identifying a homogeneous area of said at least one of said plurality of pixels of said ultrasound image, selecting a non-directional smoothing filter from a plurality of non-directional smoothing filters based on the magnitude, and applying the selected non-directional smoothing filter and not a directional edge enhancement filter to the homogeneous area.

26. The method of claim 25, wherein said applying said two-dimensional edge detection filter comprises applying said two-dimensional edge detection filter in either a vertical direction or a horizontal direction.

27. The method of claim 25, wherein said applying said directional edge enhancement filter comprises applying a directional edge enhancement filter at a strength proportional to said magnitude of said edge detection value.

28. An apparatus comprising:
an edge detection filter;
a directional edge enhancement filter;
a plurality of non-directional smoothing filters; and
an image processor to:
apply the edge detection filter to at least one of a plurality of pixels of an ultrasound image to compute an edge detection value comprising a magnitude;
apply the directional edge enhancement filter and not the non-directional smoothing filter to said at least one of said plurality of pixels of said ultrasound image if the magnitude is greater than a threshold value; and
if the magnitude is less than the threshold value, select a non-directional smoothing filter from the plurality of non-directional smoothing filters based on the magnitude, and apply the selected non-directional smoothing filter and not the directional edge enhancement filter to said at least one of said plurality of pixels of said ultrasound image.

29. The apparatus of claim 28, wherein the edge detection value comprises a direction, and wherein the image processor is further to:
select the directional edge enhancement filter based on said direction.

30. The apparatus of claim 29, wherein the image processor is further to:
extract at least one set of image filters comprising filter coefficients for one of a plurality of applications from memory devices of the apparatus;
transfer said extracted one set of image filters into a filter select look-up table of the apparatus; and
transfer a filter comprising filter coefficients to an image process filter.

31. An article of manufacturing, comprising:
a computer usable medium comprising instruction means embodied therein, said instruction means comprising:
instruction means for applying an edge detection filter across at least one of a plurality of pixels of an ultrasound image to compute an edge detection value comprising a magnitude;
instruction means for applying a directional edge enhancement filter and not a non-directional smoothing filter to said at least one of said plurality of pixels of said ultrasound image if the magnitude is greater than a threshold value; and
instruction means for selecting a non-directional smoothing filter from a plurality of non-directional smoothing filters based on the magnitude, and applying the selected non-directional smoothing filter and not a directional edge enhancement filter to said at least one of said plurality of pixels of said ultrasound image if the magnitude is less than the threshold value.

32. The article of manufacturing of claim 31, wherein the edge detection value comprises a direction, and wherein the instruction means further comprises:
instruction means for selecting the directional edge enhancement filter based on said direction.

33. A program storage device readable by machine, tangibly embodying a program of instructions executable by said machine to:
apply an edge detection filter across at least one of a plurality of pixels of an ultrasound image to compute an edge detection value comprising a magnitude;
apply a directional edge enhancement filter and not a non-directional smoothing filter to said at least one of said plurality of pixels of said ultrasound image if the magnitude is greater than a threshold value; and
if the magnitude is less than the threshold value, select a non-directional smoothing filter from a plurality of non-directional smoothing filters based on the magnitude, and apply the selected non-directional smoothing filter and not a directional edge enhancement filter to said at least one of said plurality of pixels of said ultrasound image.

34. A method according to claim 1, wherein the edge detection filter comprises:
an array of filter coefficients having a first odd number of rows and a second odd number of columns; and
a first set of zero coefficients extending along a direction traversing said array through a center position to form a first side and a second side,
wherein said first side comprises a second set of coefficients, each of said second set of coefficients being equal to 1, and
wherein said second side comprises a third set of coefficients, each of said third set of coefficients being equal to −1.

35. A method according to claim 34, wherein said direction extends horizontally across said array.

36. A method according to claim 34, wherein said direction extends vertically across said array.

37. A method according to claim 25, wherein the two-dimensional edge detection filter comprises:
an array of filter coefficients having a first odd number of rows and a second odd number of columns; and
a first set of zero coefficients extending along a direction traversing said array through a center position to form a first side and a second side,
wherein said first side comprises a second set of coefficients, each of said second set of coefficients being equal to +1, and
wherein said second side comprises a third set of coefficients, each of said third set of coefficients being equal to −1.

38. A method according to claim 37, wherein said direction extends horizontally across said array.

39. A method according to claim 37, wherein said direction extends vertically across said array.

40. An apparatus according to claim 28, wherein the edge detection filter comprises:
an array of filter coefficients having a first odd number of rows and a second odd number of columns; and
a first set of zero coefficients extending along a direction traversing said array through a center position to form a first side and a second side,
wherein said first side comprises a second set of coefficients, each of said second set of coefficients being equal to +1, and
wherein said second side comprises a third set of coefficients, each of said third set of coefficients being equal to −1.

41. An apparatus according to claim 40, wherein said direction extends horizontally across said array.

42. An apparatus according to claim 40, wherein said direction extends vertically across said array.

43. An article of manufacture according to claim 31, wherein the edge detection filter comprises:
an array of filter coefficients having a first odd number of rows and a second odd number of columns; and
a first set of zero coefficients extending along a direction traversing said array through a center position to form a first side and a second side,
wherein said first side comprises a second set of coefficients, each of said second set of coefficients being equal to +1, and
wherein said second side comprises a third set of coefficients, each of said third set of coefficients being equal to −1.

44. An article of manufacture according to claim 43, wherein said direction extends horizontally across said array.

45. An article of manufacture according to claim 43, wherein said direction extends vertically across said array.

46. A program storage device according to claim 33, wherein the edge detection filter comprises:
an array of filter coefficients having a first odd number of rows and a second odd number of columns; and
a first set of zero coefficients extending along a direction traversing said array through a center position to form a first side and a second side,
wherein said first side comprises a second set of coefficients, each of said second set of coefficients being equal to +1, and
wherein said second side comprises a third set of coefficients, each of said third set of coefficients being equal to −1.

47. A program storage device according to claim 46, wherein said direction extends horizontally across said array.

48. A program storage device according to claim 46, wherein said direction extends vertically across said array.

* * * * *

UNITED STATES PATENT AND TRADEMARK OFFICE
CERTIFICATE OF CORRECTION

| | | |
|---|---|---|
| PATENT NO. | : 7,664,326 B2 | Page 1 of 1 |
| APPLICATION NO. | : 11/065626 | |
| DATED | : February 16, 2010 | |
| INVENTOR(S) | : Tadashi Tamura | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 944 days.

Signed and Sealed this

Thirtieth Day of November, 2010

David J. Kappos
*Director of the United States Patent and Trademark Office*